United States Patent
Satou

(10) Patent No.: US 9,711,090 B2
(45) Date of Patent: Jul. 18, 2017

(54) PORTABLE ELECTRONIC DEVICE CHANGING DISPLAY BRIGHTNESS BASED ON ACCELERATION AND DISTANCE

(71) Applicant: PANASONIC CORPORATION, Osaka (JP)

(72) Inventor: Mitsuru Satou, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 100 days.

(21) Appl. No.: 14/235,878

(22) PCT Filed: May 31, 2013

(86) PCT No.: PCT/JP2013/003469
§ 371 (c)(1),
(2) Date: Jan. 29, 2014

(87) PCT Pub. No.: WO2014/024366
PCT Pub. Date: Feb. 13, 2014

(65) Prior Publication Data
US 2015/0109218 A1    Apr. 23, 2015

(30) Foreign Application Priority Data

Aug. 9, 2012 (JP) ................... 2012-177369
Sep. 4, 2012 (JP) ................... 2012-194321
Dec. 18, 2012 (JP) ................... 2012-276225

(51) Int. Cl.
*G09G 3/34* (2006.01)
*G06F 3/0488* (2013.01)
(Continued)

(52) U.S. Cl.
CPC ......... *G09G 3/3406* (2013.01); *G06F 1/3265* (2013.01); *G06F 3/0412* (2013.01);
(Continued)

(58) Field of Classification Search
CPC .............................. G06F 3/041; G09G 3/3406
See application file for complete search history.

(56) References Cited

U.S. PATENT DOCUMENTS 6,201,554 B1 * 3/2001 Lands ........................ 345/169
8,170,621 B1 * 5/2012 Lockwood ........ H04W 52/0254
455/550.1
(Continued)

FOREIGN PATENT DOCUMENTS

JP    2002-323885    11/2002
JP    2002-323942    11/2002
(Continued)

OTHER PUBLICATIONS

International Search Report in PCT/JP2013/003469, mail date is Jul. 2, 2013.
(Continued)

*Primary Examiner* — Kumar Patel
*Assistant Examiner* — Sejoon Ahn
(74) *Attorney, Agent, or Firm* — Greenblum & Bernstein, P.L.C.

(57) ABSTRACT

A portable electronic device includes: a display unit; and a touch panel which is disposed to overlap the display unit and which is able to detect a distance from an input object. If brightness of the display unit is first brightness, if there is no operation on the touch panel for a predetermined time, and if the distance is greater than a predetermined distance, the brightness of the display unit changes to second brightness darker than the first brightness. If the brightness of the display unit is the first brightness, if there is no operation on the touch panel for the predetermined time, and if the distance is equal to or smaller than the predetermined distance, the brightness of the display unit is set to third brightness brighter than at least the second brightness.

20 Claims, 14 Drawing Sheets

(51) Int. Cl.
   *G06F 1/32* (2006.01)
   *G06F 3/041* (2006.01)
   *G09G 5/08* (2006.01)

(52) U.S. Cl.
   CPC .......... *G06F 3/0416* (2013.01); *G06F 3/0488* (2013.01); *G09G 3/342* (2013.01); *G06F 2203/04101* (2013.01); *G09G 5/08* (2013.01); *G09G 2310/0213* (2013.01); *G09G 2320/0626* (2013.01); *G09G 2354/00* (2013.01); *G09G 2380/14* (2013.01); *Y02B 60/1242* (2013.01)

(56) References Cited

U.S. PATENT DOCUMENTS

| | | | |
|---|---|---|---|
| 8,843,173 B2* | 9/2014 | Lee et al. | 455/550.1 |
| 2002/0086719 A1* | 7/2002 | Kedia et al. | 455/574 |
| 2003/0037265 A1 | 2/2003 | Sameshima et al. | |
| 2006/0064203 A1* | 3/2006 | Goto | G05D 1/0246 700/245 |
| 2007/0075127 A1* | 4/2007 | Rosenberg | 235/375 |
| 2007/0132710 A1 | 6/2007 | Tateuchi et al. | |
| 2007/0208532 A1* | 9/2007 | Park | A61B 5/1112 702/158 |
| 2008/0266239 A1* | 10/2008 | Iwamoto | H04N 5/23293 345/102 |
| 2009/0146968 A1* | 6/2009 | Narita | G06F 3/0416 345/173 |
| 2010/0131749 A1* | 5/2010 | Kim | H04M 1/605 713/100 |
| 2010/0283758 A1* | 11/2010 | Homma | G06F 3/0416 345/174 |
| 2012/0065914 A1 | 3/2012 | Kiyose | |
| 2012/0075176 A1* | 3/2012 | In | G06F 3/041 345/156 |
| 2012/0154307 A1* | 6/2012 | Nunomaki | 345/173 |
| 2012/0188269 A1* | 7/2012 | Uyama | G06F 3/041 345/619 |
| 2013/0033418 A1* | 2/2013 | Bevilacqua et al. | 345/156 |
| 2013/0278560 A1 | 10/2013 | Yamaguchi | |
| 2013/0342491 A1* | 12/2013 | Liu | G06F 3/041 345/173 |
| 2014/0370909 A1* | 12/2014 | Natucci et al. | 455/456.1 |

FOREIGN PATENT DOCUMENTS

| | | |
|---|---|---|
| JP | 2006-091222 | 4/2006 |
| JP | 2007-163891 | 6/2007 |
| JP | 2011-101296 | 5/2011 |
| JP | 2012-059171 | 3/2012 |
| JP | 2012-128804 | 7/2012 |
| JP | 2012-133524 | 7/2012 |
| WO | 2012/090405 | 7/2012 |

OTHER PUBLICATIONS

U.S. Appl. No. 14/236,106 to Hideyuki Yoshino et al., which was filed on Jan. 30, 2014.

U.S. Appl. No. 14/240,778 to Takashi Ishihara et al., which was filed on Feb. 25, 2014.

* cited by examiner

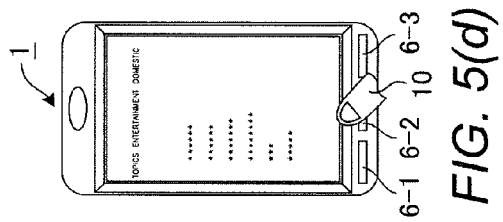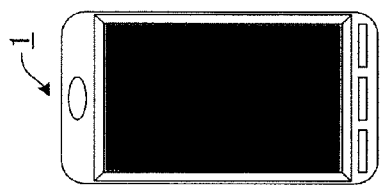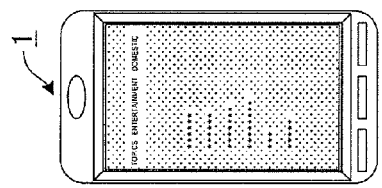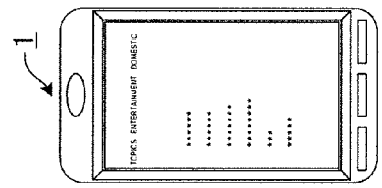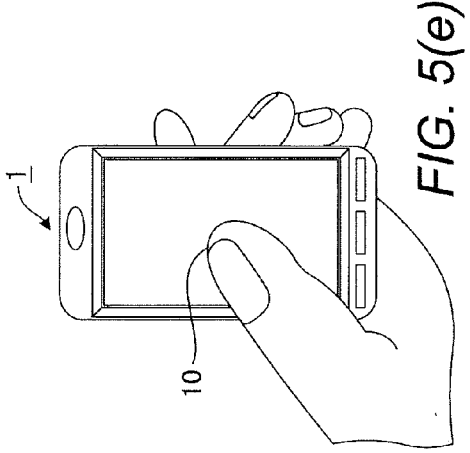

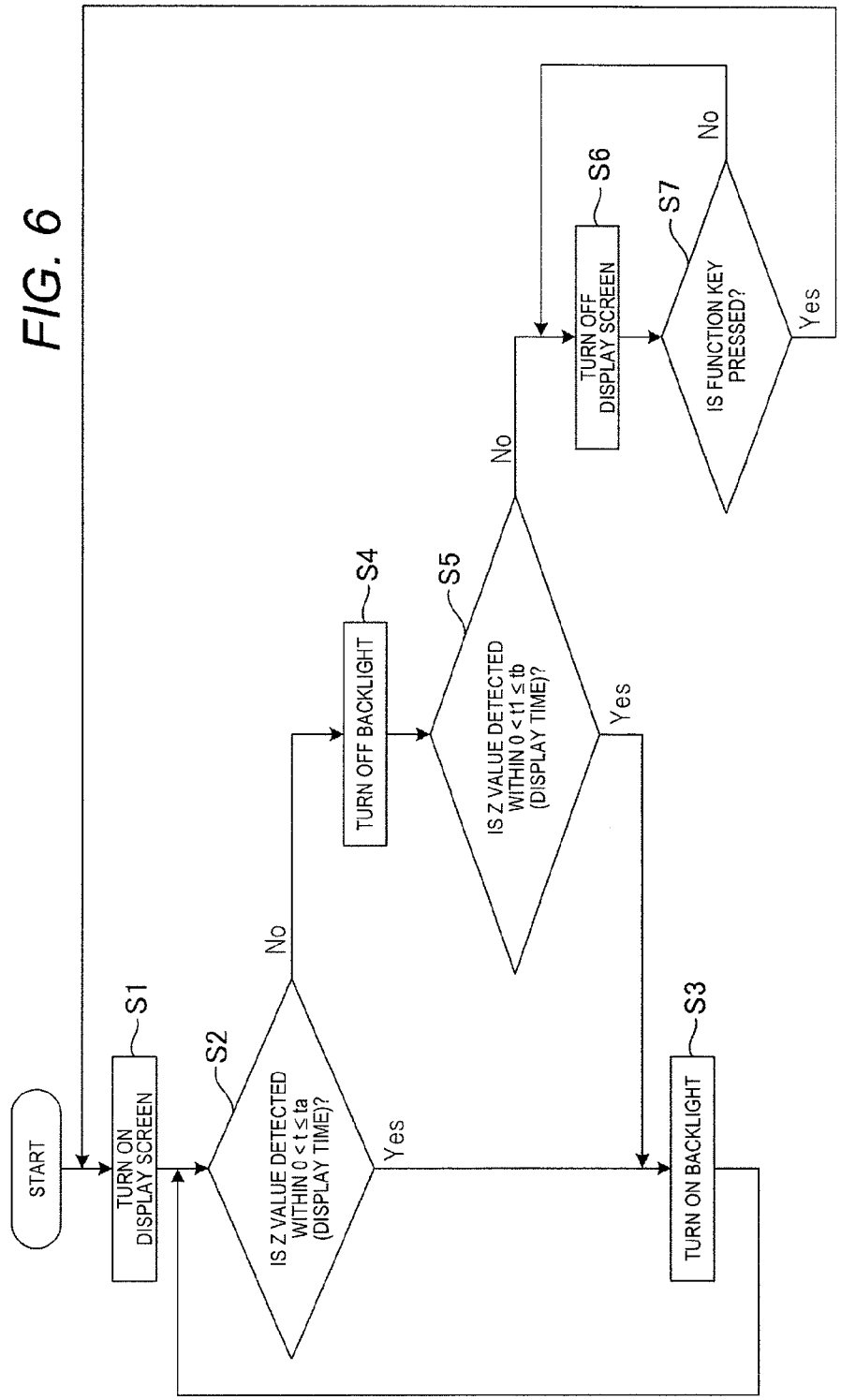

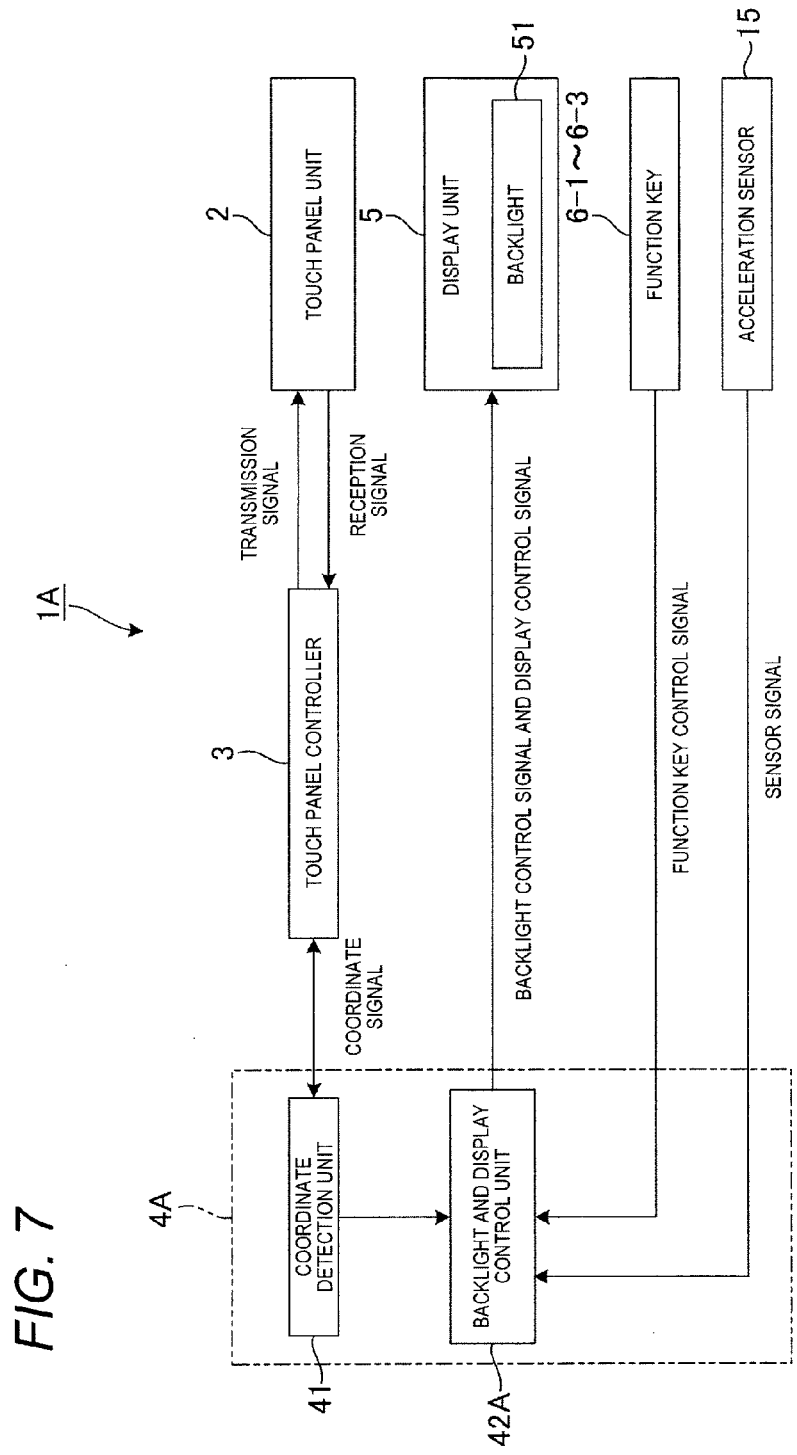

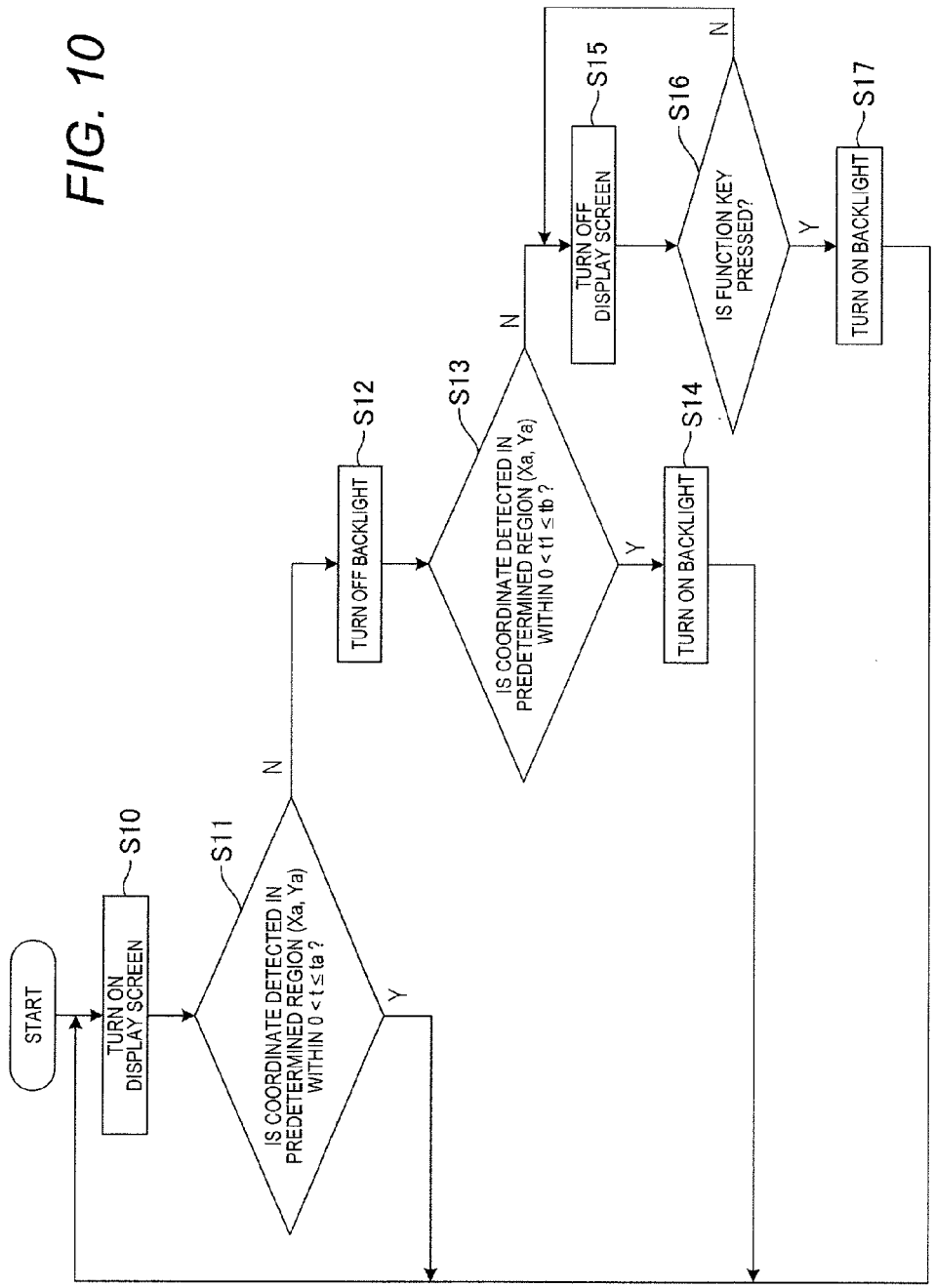

PORTABLE ELECTRONIC DEVICE CHANGING DISPLAY BRIGHTNESS BASED ON ACCELERATION AND DISTANCE

TECHNICAL FIELD

The present invention relates to a portable electronic device including a display unit and a touch panel arranged on a display surface of the display unit, and in particular, to a portable electronic device including an electrostatic capacitance type touch panel.

BACKGROUND ART

In recent years, with the widespread use of a mobile phone or an information terminal device (for example, a smartphone, a tablet, etc.), there is a greater opportunity to view a browser, an SNS (Social Networking Service), an electronic book, etc., and there has been a tendency that the operating time of the device increased.

A mobile phone or an information terminal device which has a power saving function to enable a long period of use has been known. A power saving function which turns off a light (backlight) of a display screen if there is no operation on the touch panel for a predetermined time, and thereafter, turns off the display if there is still no operation after the predetermined time has also been known.

In the portable terminal device described in Patent Document 1, if change in temperature of a housing is detected on the basis of a detection signal of a temperature sensor, the backlight is turned on, and if change in temperature in a direction opposite to the change in temperature is detected on the basis of the detection signal of the temperature sensor, the backlight is turned off, thereby achieving power saving.

RELATED ART DOCUMENTS

Patent Documents

Patent Document 1: JP-A-2006-091222

SUMMARY OF THE INVENTION

Problem to be Solved by the Invention

However, when viewing a browser, an SNS, an electronic book, or the like, if there is no operation on the touch panel for a predetermined time and the power saving function is executed, the display screen is darkened, and there is a problem in that it is difficult to view the display. If the display screen is darkened during viewing, while a key, such as a power key or a menu key, is operated to brighten the display screen, there is a problem in that, each time the display screen is darkened, the above-described operation has to be performed, and thus it is bothersome for the user.

In the portable terminal device described in Patent Document 1, since the backlight is turned on even if there is no operation while the housing is hand held, there is no situation in which it is difficult to read the display being viewed, but power is not saved during this time.

The invention has been made in consideration of the above-described circumstances, and an object thereof is to provide a portable electronic device which allows a user to arbitrarily set the brightness of a display screen even if there is no operation on a touch panel for a predetermined time.

Means for Solving the Problem

The present invention provides a portable electronic device including: a display unit; and a touch panel which is disposed to overlap the display unit and which is able to detect a distance from an input object, wherein if brightness of the display unit is first brightness, if there is no operation on the touch panel for a predetermined time, and if the distance is greater than a predetermined distance, the brightness of the display unit changes to second brightness darker than the first brightness, and wherein if the brightness of the display unit is the first brightness, if there is no operation on the touch panel for the predetermined time, and if the distance is equal to or smaller than the predetermined distance, the brightness of the display unit is set to third brightness brighter than at least the second brightness.

According to this configuration, in a state where the display unit has the first brightness, if there is no operation on the touch panel for the predetermined time and the distance between the input object and the touch panel is greater than the predetermined distance, the brightness of the display unit changes to the second brightness darker than the first brightness, and in a state where the brightness of the display unit is the first brightness, if there is no operation on the touch panel for the predetermined time and the distance between the input object and the touch panel is equal to or smaller than the predetermined distance, the brightness of the display unit changes to the third brightness brighter than at least the second brightness. For this reason, even if there is no operation on the touch panel for the predetermined time, if the input object approaches the touch panel to be equal to or smaller than the predetermined distance, it is possible to keep the display screen in a bright state. The input object is kept away from the touch panel beyond the predetermined distance, whereby the display screen is darkened and power saving is achieved.

In the above configuration, the third brightness is brighter than the second brightness and is equal to or smaller than the first brightness.

In the above configuration, the third brightness is equal to the first brightness.

In the above configuration, the second brightness is brightness of turn-off.

In the above configuration, the display unit is a liquid crystal display, and the brightness is provided by a backlight of the liquid crystal display.

In the above configuration, the predetermined time is set as a first time, if the brightness of the display unit is the first brightness, if there is no operation on the touch panel for the first time, and if the distance is greater than the predetermined distance, the brightness of the display unit changes to the second brightness, and thereafter, if the brightness of the display unit is the second brightness, if there is no operation on the touch panel for a second time, and if the distance is greater than the predetermined distance, the display of the liquid crystal display is turned off.

In the above configuration, the display unit is a self-luminous display, and the brightness is provided by self-luminescence of the display.

In the above configuration, the self-luminous display is an organic EL display.

In the above configuration, the predetermined distance is a first distance, a predetermined function which operates when the distance is equal to or smaller than a second distance is further provided, and the first distance is greater than the second distance.

The present invention provides a brightness control method which is usable in a portable electronic device including a display unit, and a touch panel which is disposed to overlap the display unit and which is able to detect a distance from an input object, the method including: if brightness of the display unit is first brightness, if there is no operation on the touch panel for a predetermined time, and if the distance is greater than a predetermined distance, changing the brightness of the display unit to second brightness darker than the first brightness; and if the brightness of the display unit is the first brightness, if there is no operation on the touch panel for the predetermined time, and if the distance is equal to or smaller than the predetermined distance, setting the brightness of the display unit to third brightness brighter than at least the second brightness.

The present invention provides a portable electronic device includes: a display unit; and a touch panel which is disposed to overlap the display unit, which is able to detect a distance from an input object, and which includes a predetermined region, wherein if brightness of the display unit is first brightness, if there is no operation on the touch panel for a predetermined time, and if the distance is greater than a predetermined distance, the brightness of the display unit changes to second brightness darker than the first brightness, and wherein if the brightness of the display unit is the first brightness, if there is no operation on the touch panel for the predetermined time, if the input object is in the predetermined region, and if the distance is equal to or smaller than the predetermined distance, the brightness of the display unit is set to third brightness brighter than at least the second brightness.

With the above configuration, in a state where the display unit has the first brightness, if there is no operation on the touch panel for the predetermined time, and the distance between the input object and the touch panel at this time is greater than the predetermined distance, since the brightness of the display unit changes to the second brightness darker than the first brightness, power saving is achieved.

In a state where the brightness of the display unit is the first brightness, if there is no operation on the touch panel for the predetermined time, the input object is in the predetermined region, and the distance between the input object and the touch panel at this time is equal to or smaller than the predetermined distance, the brightness of the display unit changes to the third brightness brighter than at least the second brightness. For this reason, even if there is no operation on the touch panel for the predetermined time, if the input object approaches the touch panel in the predetermined region to be equal to or smaller than the predetermined distance, it is possible to keep the display unit in a bright state.

In the above configuration, if the brightness of the display unit is the first brightness, if there is no operation on the touch panel for the predetermined time, if the input object is located outside the predetermined region, and if the distance is equal to or smaller than the predetermined distance, the brightness of the display unit is set to the second brightness.

With the above configuration, in a state where the brightness of the display unit is the first brightness, there is no operation on the touch panel for the predetermined time, the input object is located outside the predetermined region, and the distance between the input object and the touch panel at this time is equal to or smaller than the predetermined distance, since the brightness of the display unit changes to the second brightness, power saving is achieved.

In the above configuration, the portable electronic device further includes an acceleration sensor, in which, if the brightness of the display unit is the first brightness, if there is no operation on the touch panel for the predetermined time, if the input object is in the predetermined region, if the distance is equal to or smaller than the predetermined distance, and if the acceleration sensor does not detect a predetermined acceleration, the brightness of the display unit is set to the third brightness, and if the brightness of the display unit is the first brightness, if there is no operation on the touch panel for the predetermined time, if the input object is in the predetermined region, if the distance is equal to or smaller than the predetermined distance, and if the acceleration sensor detects the predetermined acceleration, the brightness of the display unit is set to the second brightness.

With the above configuration, in a state where the brightness of the display unit is the first brightness, if there is no operation on the touch panel for the predetermined time, the input object is in the predetermined region, the distance between the input object and the touch panel at this time is equal to or smaller than the predetermined distance, and the acceleration sensor does not detect the predetermined acceleration, the brightness of the display unit is set to the third brightness, and in a state where the brightness of the display unit is the first brightness, if there is no operation on the touch panel for the predetermined time, the input object is in the predetermined region, the distance between the input object and the touch panel at this time is equal to or smaller than the predetermined distance, and the acceleration sensor detects the predetermined acceleration, the brightness of the display unit is set to the second brightness. For this reason, even if the portable electronic device is hand held, if the portable electronic device is not in an operating state, since the display screen is automatically darkened, power saving is achieved.

In the above configuration, the third brightness is brighter than the second brightness and is equal to or smaller than the first brightness.

In the above configuration, the third brightness is equal to the first brightness.

In the above configuration, the second brightness is brightness of turn-off.

In the above configuration, the display unit is a liquid crystal display, and the brightness is provided by a backlight of the liquid crystal display.

In the above configuration, the display unit is a self-luminous display, and the brightness is provided by self-luminescence of the display.

In the above configuration, the self-luminous display is an organic EL display.

In the above configuration, the predetermined distance is a first distance, a predetermined function which operates when the distance is equal to or smaller than a second distance is further provided, and the first distance is greater than the second distance.

The present invention provides a brightness control method which is usable in a portable electronic device including a display unit, and a touch panel, which is disposed to overlap the display unit, which is able to detect a distance from an input object, and which includes a predetermined region, the method including: if brightness of the display unit is first brightness, if there is no operation on the touch panel for a predetermined time, and if the distance is greater than a predetermined distance, changing the brightness of the display unit to second brightness darker than the first brightness; and if the brightness of the display unit is the first brightness, if there is no operation on the touch panel for the predetermined time, if the input object is in the predetermined region, and if the distance is equal to or smaller than the predetermined distance, setting the brightness of the display unit to third brightness brighter than at least the second brightness.

The present invention provides a portable electronic device including: a display unit; and a touch panel which is disposed to overlap the display unit and which is able to detect a distance from a human body and an area of the human body when the distance is a predetermined distance, wherein if brightness of the display unit is first brightness, and if at least the area of the human body is greater than a first area, the brightness of the display unit changes to second brightness darker than the first brightness, and wherein if the brightness of the display unit is the second brightness, and if at least the area of the human body is smaller than a second area, the brightness of the display unit is set to third brightness brighter than at least the second brightness.

With the above configuration, in a state where the display unit has the first brightness, if the area of the human body detected on the touch panel is greater than the first area, since the brightness of the display unit changes to the second brightness darker than the first brightness, while there is no operation on the touch panel and the portable electronic device is just hand held, it is possible to keep the display screen in a dark state, thereby achieving power saving.

In a state where the brightness of the display unit is the second brightness, if the area of the human body detected on the touch panel is smaller than the second area, since the brightness of the display unit changes to the third brightness brighter than at least the second brightness, during standby for operation on the touch panel or while operation is performed on the touch panel, it is possible to keep the display screen in a bright state.

In the above configuration, the first area and the second area are substantially equal to each other.

In the above configuration, the first area is greater than the second area.

In the above configuration, if the brightness of the display unit is the first brightness, and if a state in which at least the area of the human body is greater than the first area continues for a first time, the brightness of the display unit changes to the second brightness darker than the first brightness, and if the brightness of the display unit is the second brightness, and if a state where at least the area of the human body is smaller than the second area continues for a second time, the brightness of the display unit is set to the third brightness brighter than at least the second brightness.

With the above configuration, even if the area of the human is temporarily greater than the first area, there is no change to the second brightness, and even if the area of the human body is temporarily smaller than the second area, there is no change to the third brightness, whereby it is possible to prevent erroneous operation.

In the above configuration, the first time and the second time are substantially equal to each other.

In the above configuration, the third brightness is brighter than the second brightness and is equal to or smaller than the first brightness.

In the above configuration, the third brightness is equal to the first brightness.

In the above configuration, the second brightness is brightness of turn-off.

In the above configuration, the display unit is a liquid crystal display, and the brightness is provided by a backlight of the liquid crystal display.

In the above configuration, the display unit is a self-luminous display, and the brightness is supplied by self-luminescence of the display.

In the above configuration, the self-luminous display is an organic EL display.

In the above configuration, the predetermined distance is at least greater than zero.

In the above configuration, the predetermined distance is a first distance, a predetermined function which operates when the distance is equal to or smaller than a second distance is further provided, and the first distance is greater than the second distance.

The present invention provides a brightness control method which is usable in a portable electronic device including a display unit, and a touch panel which is disposed to overlap the display unit and which is able to detect the distance from a human body and an area of the human body when a distance is a predetermined distance, the method including: if the brightness of the display unit is first brightness, and if at least the area of the human body is greater than a first area, changing the brightness of the display unit to second brightness darker than the first brightness; and if the brightness of the display unit is the second brightness, and if at least the area of the human body is smaller than a second area, setting the brightness of the display unit to third brightness brighter than at least the second brightness.

Advantages of the Invention

According to the invention, even if there is no operation on the touch panel for a predetermined time, it is possible to allow the user to arbitrarily set the brightness of the display screen.

BRIEF DESCRIPTION OF THE DRAWINGS

FIGS. 5(a) to 5(e) are diagrams showing change in brightness of a display unit depending on a difference in an operating state of the portable electronic device of FIG. 1.

FIG. 6 is a flowchart showing brightness change processing of the portable electronic device of FIG. 1.

FIG. 7 is a block diagram showing the schematic configuration of a portable electronic device according to Embodiment 2 of the invention.

FIG. 10 is a flowchart showing brightness change processing when acceleration detection is not performed in the portable electronic device of FIG. 7.

MODE FOR CARRYING OUT THE INVENTION

Figure 1:
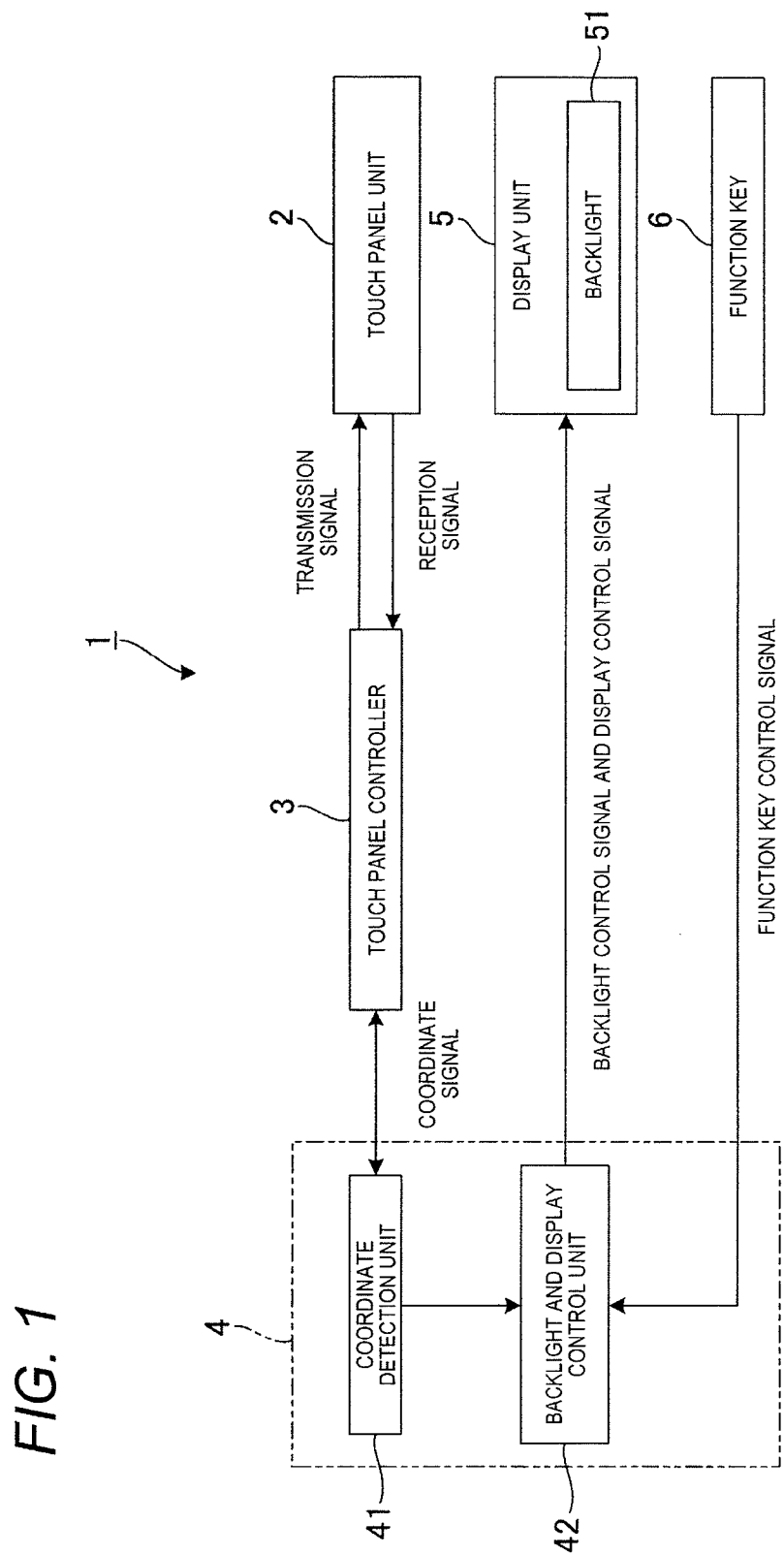
FIG. 1 is a block diagram showing the schematic configuration of a portable electronic device according to Embodiment 1 of the invention.

Hereinafter, a preferred embodiment for carrying out the invention will be described in detail referring to the drawings.

Embodiment 1

Figure 2:
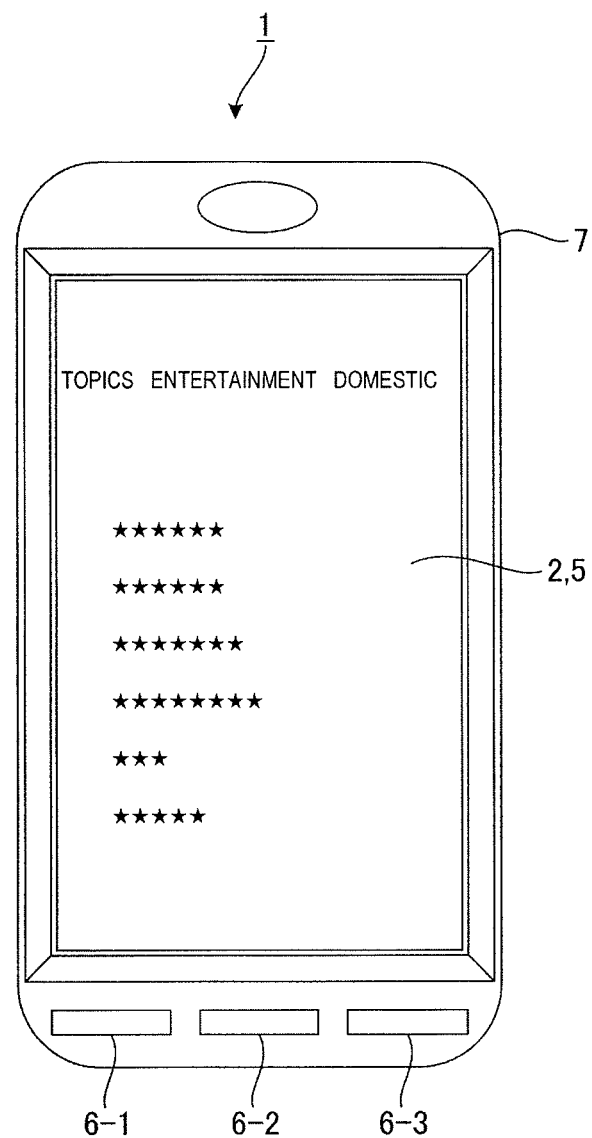
FIG. 2 is a front view showing the outline of the portable electronic device of FIG. 1.

FIG. 1 is a block diagram showing the schematic configuration of a portable electronic device according to Embodiment 1 of the invention. FIG. 2 is a front view showing the outline of the portable electronic device of FIG. 1. A portable electronic device 1 of this embodiment is applied to, for example, a portable wireless device, also known as a smartphone. A portion relating to communication as a wireless device is omitted.

In FIG. 1, the portable electronic device 1 of this embodiment includes a touch panel unit (touch panel) 2, a touch panel controller 3, a device control unit 4, a display unit 5, and a function key 6. As shown in FIG. 2, the portable electronic device 1 of this embodiment has a longitudinal rectangular housing 7, and on the front surface side of the housing 7, the touch panel unit 2 and the display unit 5 having a slightly smaller area than the area of the front surface of the housing 7 are arranged in a laminated state. In this case, the touch panel unit 2 is arranged on the front surface side of the display unit 5. In a lower end portion on the front surface side of the housing 7, as the function key 6, three function keys 6-1 to 6-3 are arranged at regular intervals. Returning to FIG. 1, the touch panel controller 3 and the device control unit 4 are constituted by a CPU (Central Processing Unit), a ROM (Read Only Memory), a RAM (Random Access Memory), and an interface circuit. A program for controlling the CPU is stored in the ROM, and the RAM is used in the operation of the CPU.

The touch panel unit 2 is an electrostatic capacitance type in which operation (this is referred to as "hover operation") can be performed at a height in a predetermined range without touching an input object (a finger of a user or a pen, and in this embodiment, treated as "finger") on a panel surface. The touch panel unit 2 includes a transmission electrode and a reception electrode (not shown), and these electrodes are arranged separately on a lower surface of a plate-shaped dielectric. A driving pulse based on a transmission signal output from the touch panel controller 3 is applied to the transmission electrode, and an electric field is generated from the transmission electrode with the application of the driving pulse. If the finger enters the electric field generated from the transmission electrode, the number of lines of electric force between the transmission electrode and the reception electrode decreases, and change in the number of lines of electric force appears as change in electric charge in the reception electrode. The touch panel unit 2 outputs a reception signal according to change in electric charge in the reception electrode to the touch panel controller 3. The touch panel controller 3 outputs the transmission signal to the touch panel unit 2, and also receives the reception signal output from the touch panel unit 2 as input. The touch panel controller 3 detects the finger as the input object from the reception signal output from the touch panel unit 2, and outputs a coordinate signal representing the position (X, Y, Z) of the detected finger to the device control unit 4.

The display unit 5 has a quadrangular shape, and is used in display for operating the portable electronic device 1 of this embodiment or display of an image or the like. As the display unit 5, a liquid crystal display (LCD) is used, and brightness is supplied by a backlight 51. The device control unit 4 has a coordinate detection unit 41 and a backlight and display control unit 42. The coordinate detection unit 41 outputs a control signal to the touch panel controller 3, and outputs the coordinate signal from the touch panel controller 3 to the backlight and display control unit 42. The coordinate signal output from the touch panel controller 3 is a signal which represents the position (X, Y, Z) of the finger above the touch panel unit 2.

The backlight and display control unit 42 outputs a backlight control signal for turning on the backlight 51 to the display unit 5, and also outputs a display control signal according to touch operation or hover operation on the touch panel unit 2. The backlight and display control unit 42 executes a predetermined function in response to a function key control signal output from the function key 6 (6-1 to 6-3), and performs turn-on control of the backlight 51 of the display unit 5 on the basis of the function key control signal and the coordinate signal output from the coordinate detection unit 41. That is, the backlight and display control unit 42 determines the proximity of the finger from a Z signal in a Z-axis direction out of the coordinate signal output from the coordinate detection unit 41, and when the finger approaches, determines the distance between the finger and the touch panel unit 2. When the determined distance is within an operation range in the touch panel unit 2, operation on the touch panel unit 2 is detected.

If the brightness of the display unit 5 is first brightness, there is no operation on the touch panel unit 2 for a first time (predetermined time) (there is neither touch operation nor hover operation), and the distance between the finger and the touch panel unit 2 is greater than a predetermined distance, the backlight and display control unit 42 outputs a backlight control signal for setting the brightness of the display unit 5 to second brightness darker than the first brightness to the display unit 5. Thereafter, if the brightness of the display unit 5 is the second brightness, there is no operation on the touch panel unit 2 for a second time (there is neither touch operation nor hover operation), and the distance between the finger and the touch panel unit 2 is greater than the predetermined distance, the backlight and display control unit 42 outputs a display control signal for turning out the display of the display unit 5 to the display unit 5. If the brightness of the display unit 5 is the first brightness, there is no operation on the touch panel unit 2 for the first time (there is neither touch operation nor hover operation), and the distance between the finger and the touch panel unit 2 is equal to or smaller than the predetermined distance, the backlight and display control unit 42 outputs a backlight control signal for setting the brightness of the display unit 5 to third brightness brighter than the second brightness to the display unit 5.

The third brightness of the display unit 5 may be equal to or smaller than the first brightness, or may be equal to the first brightness. The second brightness may be brightness of turn-off. The first time and the second time may be different from each other or may be equal to each other.

Figure 3:
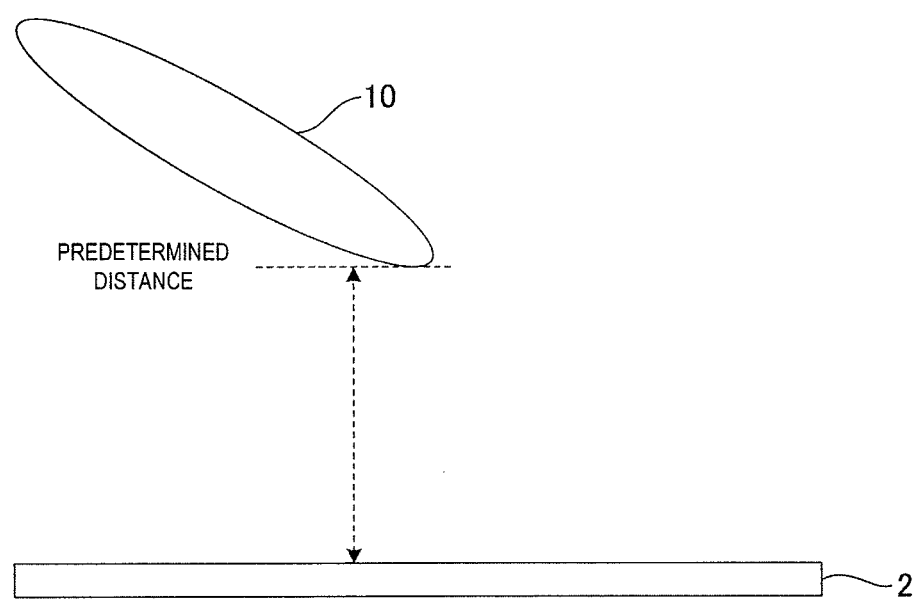
FIG. 3 is a diagram showing the positional relationship between a touch panel unit of the portable electronic device of FIG. 1 and a finger.

FIG. 3 is a diagram showing the positional relationship between the touch panel unit 2 and a finger 10. In FIG. 3, when the distance between the finger 10 and the touch panel unit 2 is greater than the predetermined distance, if the display unit 5 has the first brightness, and there is no operation on the touch panel unit 2 for the first time, the brightness of the display unit 5 becomes the second brightness darker than the first brightness. If the display unit 5 has the second brightness, and there is no operation on the touch panel unit 2 for the second time, the display of the display unit 5 is turned off. When the distance between the finger 10 and the touch panel unit 2 is equal to or smaller than the predetermined distance, if the display unit 5 has the first brightness, and there is no operation on the touch panel unit 2 for the first time, the brightness of the display unit 5 becomes the third brightness brighter than the second brightness.

In this way, when the display unit 5 has the first brightness, and there is no operation on the touch panel unit 2 for the first time, if the distance between the finger 10 and the touch panel unit 2 is greater than the predetermined distance, the display unit 5 changes to the second brightness darker than the first brightness. Thereafter, if the brightness of the display unit 5 is the second brightness, there is no operation on the touch panel unit 2 for the second time, and the distance between the finger 10 and the touch panel unit 2 is greater than the predetermined distance, the display of the display unit 5 is turned off. When the display unit 5 has the first brightness, and there is no operation on the touch panel unit 2 for the first time, if the distance between the finger 10 and the touch panel unit 2 is equal to or smaller than the predetermined distance, the display unit 5 changes to the third brightness brighter than the second brightness.

Figure 4:
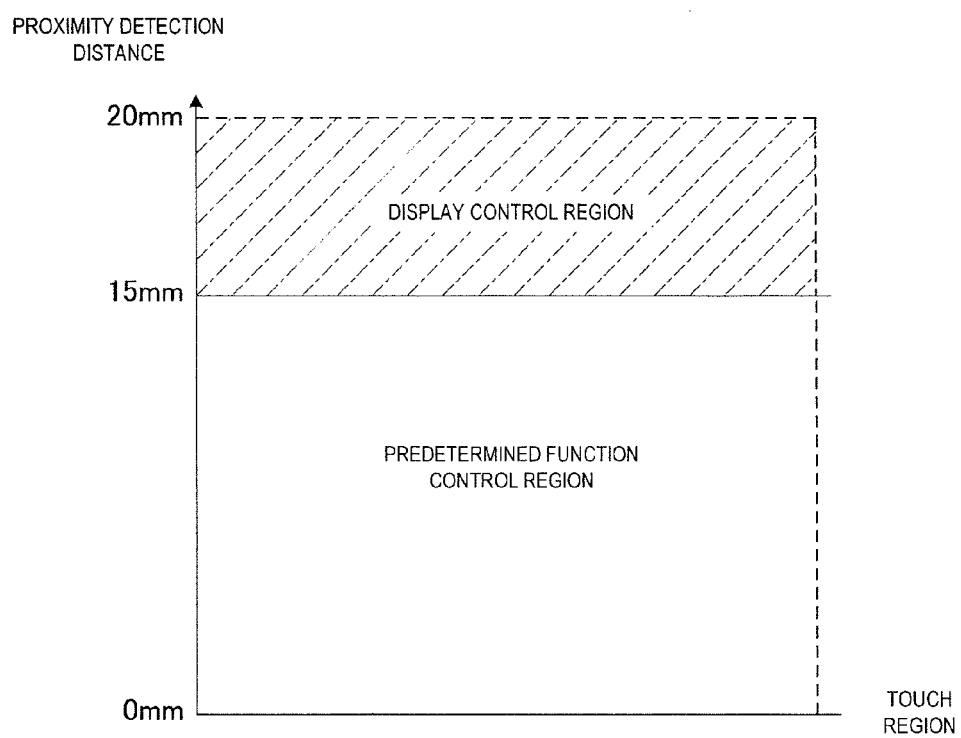
FIG. 4 is a diagram schematically showing an example of the size of a touch region and a proximity detection distance of a finger in the portable electronic device of FIG. 1.

FIG. 4 is a diagram schematically showing an example of the size of a touch region and a proximity detection distance of a finger in the portable electronic device 1 of this embodiment. In FIG. 4, the horizontal axis direction represents the size of the touch region in the touch panel unit 2, and the vertical axis direction represents the proximity detection distance of the finger with respect to the touch panel unit 2. In the example shown in FIG. 4, when a first distance L1 is 20 mm, a second distance L2 is 15 mm, and the distance between the finger 10 and the touch panel unit 2 is greater than 15 mm and equal to or smaller than 20 mm, the brightness of the display unit 5 is set to the first brightness or the third brightness brighter than the second brightness. When the distance between the finger 10 and the touch panel unit 2 exceeds 20 mm, the brightness of the display unit 5 is set to the second brightness darker than the first brightness. When the distance between the finger 10 and the touch panel unit 2 is equal to or smaller than 15 mm, a predetermined function operates. That is, if the distance between the finger 10 and the touch panel unit 2 is greater than 15 mm, control relating to display is performed, and if the distance is equal to or smaller than 15 mm, control relating to a function other than display is performed.

FIGS. 5(a) to 5(e) are diagrams showing change in brightness of the display unit 5 depending on a difference in an operating state of the portable electronic device 1 of this embodiment. FIG. 5(a) is a diagram showing a state where, during browser viewing, the backlight 51 of the display unit 5 is turned on, and FIG. 5(b) is a diagram showing a state where, during browser viewing, the backlight 51 of the display unit 5 is turned off. FIG. 5(c) is a diagram showing a state where, during browser viewing, the backlight 51 of the display unit 5 is turned off and the display of the display unit 5 is turned off, and FIG. 5(d) is a diagram showing a state where, during browser viewing, the backlight 51 of the display unit 5 is turned on by the pressing of the function key 6-2. FIG. 5(e) is a diagram showing a state where the finger 10 is present within a limit distance over the touch panel unit 2 and the backlight 51 of the display unit 5 is turned on.

Next, the operation of the portable electronic device 1 of this embodiment will be described.

FIG. 6 is a flowchart showing brightness change processing of the portable electronic device 1 of this embodiment. In FIG. 6, the backlight and display control unit 42 turns on the display screen of the display unit 5 (Step S1). That is, as shown in FIG. 5(b), only the liquid crystal display operates until the backlight 51 is turned off.

Next, the backlight and display control unit 42 determines whether or not the Z value is detected by the coordinate detection unit 41 when an elapsed time t after the display screen is turned on is within a predetermined time ta (Step S2). The Z value corresponds to the limit distance (predetermined distance) at which the finger 10 can be detected, and is determined by the capacity of the touch panel unit 2. With the determination of Step S2, if the Z value is detected by the coordinate detection unit 41 when the elapsed time t after the display screen is turned on is within the predetermined time ta ("Yes"), the backlight and display control unit 42 turns on the backlight 51 of the display unit 5 (Step S3). That is, as shown in FIG. 5(a), the backlight 51 is turned on. As shown in FIG. 5(e), while the finger 10 is present within the limit distance over the touch panel unit 2, Steps S2 and S3 are repeatedly performed, and the backlight 51 is turned on.

After the backlight 51 is turned on, the process returns to Step S2, and the same processing is performed again. Meanwhile, if the Z value is not detected by the coordinate detection unit 41 when the elapsed time t after the display screen is turned on is within the predetermined time ta ("No"), since the limit distance at which the finger 10 can be detected is exceeded, the backlight and display control unit 42 turns off the backlight 51 of the display unit 5 (Step S4). That is, as shown in FIG. 5(b), the backlight 51 is turned off.

After the backlight 51 of the display unit 5 is turned off, the backlight and display control unit 42 determines whether or not the Z value is detected by the coordinate detection unit 41 when an elapsed time t1 after the backlight 51 is turned off is within a predetermined time tb (Step S5). With this determination, if the Z value is detected by the coordinate detection unit 41 when the elapsed time t1 after the backlight 51 is turned off is within the predetermined time tb ("Yes"), the backlight and display control unit 42 turns on the backlight 51 of the display unit 5 (Step S3). Meanwhile, if the Z value is detected by the coordinate detection unit 41 when the elapsed time t1 after the backlight 51 is turned off is within the predetermined time tb ("No"), the backlight and display control unit 42 turns off the display screen (Step S6). That is, as shown in FIG. 5(c), the backlight 51 of the display unit 5 is turned off and the display of the display unit 5 is turned off.

After the display screen of the display unit 5 is turned off, it is determined whether or not one of the function keys 6-1 to 6-3 is pressed (Step S7). When any function key is not pressed ("No"), the process returns to Step S6, and when any function key is pressed ("Yes"), the process returns to Step S1. Instead of operating the function keys 6-1 to 6-3, the touch panel unit 2 may be touched. When the touch panel unit 2 is touched, the process returns from Step S7 to Step S1.

In this way, according to the portable electronic device 1 of this embodiment, in a state where the display unit 5 has the first brightness, if there is no operation on the touch panel unit 2 for the first time, the distance between the finger 10 and the touch panel unit 2 is greater than the predetermined distance, the brightness of the display unit 5 changes to the second brightness darker than the first brightness. Thereafter, if the brightness of the display unit 5 is the second brightness, and there is no operation on the touch panel unit 2 for the second time, and the distance between the finger 10 and the touch panel unit 2 is greater than the predetermined distance, the display of the display unit 5 is turned off. In a state where the brightness of the display unit 5 is the first brightness, if there is no operation on the touch panel unit 2 for the first time, and the distance between the finger 10 and the touch panel unit 2 is equal to or smaller than the predetermined distance, the brightness of the display unit 5 changes to the third brightness brighter than the second brightness.

Accordingly, even if there is no operation on the touch panel unit 2 for the first time, if the finger 10 approaches the touch panel unit 2 to be equal to or smaller than the predetermined distance, it is possible to keep the display screen of the display unit 5 in a bright state. When the finger 10 is separated from the touch panel unit 2 beyond the predetermined distance, the display screen is darkened, thereby achieving power saving.

In the portable electronic device 1 of this embodiment, although the liquid crystal display is used as the display unit 5, a self-luminous display, such as an organic EL (Electro Luminescence) display, may be used. When a self-luminous display is used, of course, the backlight 51 is not required.

In the portable electronic device 1 of this embodiment, although a program in which the processing shown in the flowchart of FIG. 6 is described is stored in the ROM, the program may be distributed in the form of being stored in a storage medium, such as a magnetic disk, an optical disk, a magneto-optical disk, or a flash memory, or may be stored in a server (not shown) on a network, such as Internet and downloaded using a telecommunication line.

Although the portable electronic device 1 of this embodiment is applied to a portable wireless device, also known as a smartphone, the invention is not limited to a portable wireless device, and may be applied to an appliance, such as a microwave oven, or a control panel, such as a navigation of an automobile.

Embodiment 2

FIG. 7 is a block diagram showing the schematic configuration of a portable electronic device according to Embodiment 2 of the invention. In FIG. 7, the portions common to FIG. 1 are represented by the same reference numerals. Since the outline of a portable electronic device 1A of this embodiment is the same as the outline (see FIG. 2) of the portable electronic device 1 of Embodiment 1, FIG. 2 is incorporated as necessary for description. Similarly to the portable electronic device 1 of Embodiment 1, the portable electronic device 1A of this embodiment is applied to, for example, a portable wireless device, also known as a smartphone. A portion relating to communication as a wireless device is omitted.

In FIG. 7, the portable electronic device 1A of this embodiment includes a touch panel unit (touch panel) 2, a touch panel controller 3, a device control unit 4A, a display unit 5, a function key 6, and an acceleration sensor 15. In FIG. 2, on the front surface side of a housing 7 of the portable electronic device 1A, the touch panel unit 2 and the display unit 5 are arranged in a laminated state. In a lower end portion on the front surface side of the housing 7, three function keys 6-1 to 6-3 are arranged at regular intervals. The touch panel controller 3 and the device control unit 4A are constituted by a CPU, a ROM, a RAM, and an interface circuit. A program for controlling the CPU is stored in the ROM, and the RAM is used in the operation of the CPU.

The touch panel unit 2 outputs a reception signal according to change in electric charge in a reception electrode to the touch panel controller 3. The touch panel controller 3 outputs a transmission signal to the touch panel unit 2, and also receives the reception signal output from the touch panel unit 2 as input. When the reception signal from the touch panel unit 2 is input, the touch panel controller 3 detects an input object from the input reception signal, and outputs a coordinate signal representing the position (X, Y, Z) of the detected input object to the device control unit 4A. The input object is "metal, such as a key", which is reactive with the touch panel unit 2, other than "finger" described above.

As the display unit 5, a liquid crystal display (LCD) is used, and brightness is supplied by the backlight 51. The function keys 6-1 to 6-3 are used to execute three functions provided in the portable electronic device 1B, and a function key control signal is output from each function key. The acceleration sensor 15 detects shaking or the upward or downward direction of the portable electronic device 1A of this embodiment, and outputs a sensor signal according to shaking or the upward or downward direction. The device control unit 4A has a coordinate detection unit 41 and a backlight and display control unit 42B. The coordinate detection unit 41 outputs a control signal to the touch panel controller 3, and outputs the coordinate signal from the touch panel controller 3 to the backlight and display control unit 42A. The coordinate signal output from the touch panel controller 3 is a signal which represents the position (X, Y, Z) of the input object above the touch panel unit 2.

The backlight and display control unit 42A outputs a backlight control signal for turning on the backlight 51 to the display unit 5, and also outputs a display control signal according to touch operation or hover operation on the touch panel unit 2. The backlight and display control unit 42A executes a predetermined function in response to the function key control signal output from each of the function keys 6-1 to 6-3. The backlight and display control unit 42A detects operation (touch operation or hover operation) on the touch panel unit 2 on the basis of the coordinate signal output from the coordinate detection unit 41. That is, the proximity of the input object is determined from a Z signal in a Z-axis direction out of the coordinate signal output from the coordinate detection unit 41, and when the distance between the input object and the touch panel unit 2 is equal to or smaller than a predetermined distance ("second distance" described below), operation on the touch panel unit 2 is detected from an X signal in an X-axis direction and a Y signal in a Y-axis direction output from the coordinate detection unit 41.

The backlight and display control unit 42A performs turn-on control of the backlight 51 of the display unit 5 on the basis of the time (no-operation time) for which there is no operation on the touch panel unit 2, the presence/absence of the input object inside the predetermined region set in the touch panel unit 2, the distance from the touch panel unit 2 to the input object (a reference distance is "first distance"), and the presence/absence of acceleration detection by the acceleration sensor 15. The backlight and display control unit 42A has a timer function and measures the no-operation time.

Figure 8:
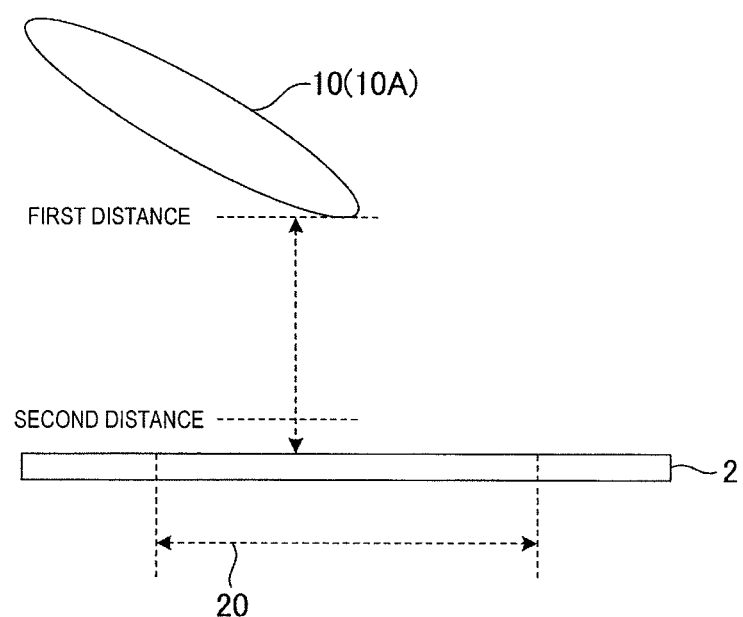
FIG. 8 is a diagram showing the positional relationship between a touch panel unit in the portable electronic device of FIG. 7 and an input object.
Figure 9A:
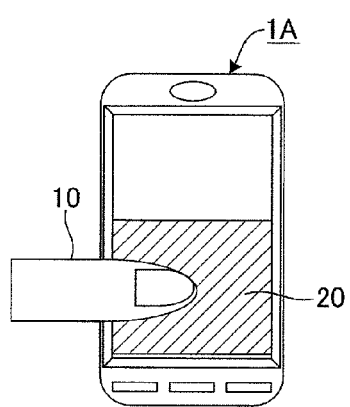
FIGS. 9(a) and 9(d) are diagrams showing an operating form of the portable electronic device of FIG. 7.
Figure 9B:
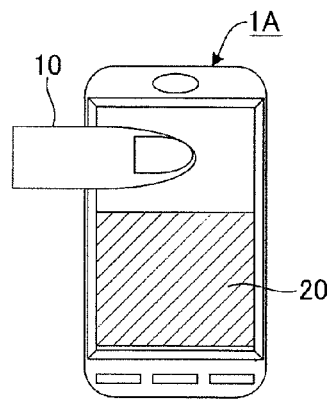
Figure 9C:
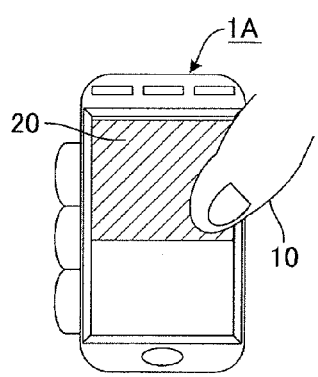
Figure 9D:
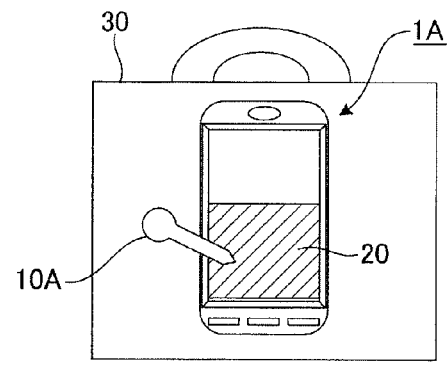

FIG. 8 is a diagram showing the positional relationship between the touch panel unit 2 and an input object 10. In the portable electronic device 1A of this embodiment, since it is assumed that the input object is "metal, such as a key", other than "finger", the "finger" is represented by reference numeral "10", and the "metal, such as a key" is represented by reference numeral "10A". In FIG. 8, the first distance from the touch panel unit 2 to the input object 10 (10A) is a distance which is used in turn-on determination of the display unit 5. The second distance over the touch panel unit 2 is a distance which is used in operation detection in the touch panel unit 2. A predetermined region (Xa, Ya) 20 is set in the touch panel unit 2.

In the portable electronic device 1A of this embodiment, the relationship between the size of the touch region and the proximity detection distance of the input object is the same as that in an example shown in FIG. 4. That is, when the distance between the input object 10 (10A) and the touch panel unit 2 is greater than 15 mm and equal to or smaller than 20 mm, the brightness of the display unit 5 is set to the first brightness or the third brightness brighter than the second brightness. When the distance between the input object 10 (10A) and the touch panel unit 2 exceeds 20 mm, the brightness of the display unit 5 is set to the second brightness darker than the first brightness. When the distance between the input object 10 (10A) and the touch panel unit 2 is equal to or smaller than 15 mm, a predetermined function operates. That is, if the distance between the input object 10 (10A) and the touch panel unit 2 is greater than 15 mm, control relating to display is performed, and if the distance is equal to or smaller than 15 mm, control relating to a function other than display is performed.

In the display unit 5, when the display of the display screen is performed, this is referred to as "display screen on", and when the display of the display screen is not performed, this is referred to as "display screen off". In the backlight 51 of the display unit 5, when the backlight 51 is turned on, this is referred to as "backlight on", and when the backlight 51 is turned off, this is referred to as "backlight off". The first brightness is brightness during display screen on and backlight on, the second brightness is brightness (turn-off) during display screen off and backlight off, and the third brightness is brightness during display screen on. While the brightness (third brightness) only during display screen on becomes darker than the first brightness when the backlight 51 is turned on, the brightness may be equal to the first brightness.

The turn-on control of the display unit 5 by the backlight and display control unit 42A is performed as follows.

(1) In the case of display screen on and backlight on (the case of the first brightness), if there is no operation on the touch panel unit 2 for a predetermined time (there is neither touch operation nor hover operation), and the distance between the input object 10 (10A) and the touch panel unit 2 is greater than the first distance (predetermined distance), a backlight control signal and a display control signal for making display screen off and backlight off (setting the second brightness darker than the first brightness) are output to the display unit 5. That is, if there is no operation for the predetermined time, if the input object 10 (10A) is separated from the touch panel unit 2 beyond the first distance, the brightness of the display unit 5 is set to the second brightness darker than the first brightness.

(2) In the case of display screen on and backlight on (the case of the first brightness), if there is no operation on the touch panel unit 2 for the predetermined time (there is neither touch operation nor hover operation), the input object 10 (10A) is present inside the predetermined region (Xa, Ya) 20 set in the touch panel unit 2, and the distance between the input object 10 (10A) and the touch panel unit 2 is equal to or smaller than the first distance, a backlight control signal and a display control signal for maintaining backlight on (setting the third brightness brighter than the second brightness) are output to the display unit 5. That is, if there is no operation for the predetermined time, if the input object 10 (10A) is at equal to or smaller than the first distance from the touch panel unit 2 over the predetermined region (Xa, Ya) 20 set in the touch panel unit 2, the brightness of the display unit 5 is set to the third brightness brighter than the second brightness.

(3) In the case of display screen on and backlight on (the case of the first brightness), if there is no operation on the touch panel unit 2 for the predetermined time (there is neither touch operation nor hover operation), the input object 10 (10A) is located outside the predetermined region (Xa, Ya) 20 set in the touch panel unit 2, and the distance between the input object 10 (10A) and the touch panel unit 2 is equal to or smaller than the first distance, a backlight control signal and a display control signal for making display screen off and backlight off (setting the second brightness darker than the first brightness) are output to the display unit 5. That is, if there is no operation for the predetermined time, if the input object 10 (10A) is at equal to or smaller than the first distance from the touch panel unit 2 over a region outside the predetermined region (Xa, Ya) 20 set in the touch panel unit 2, the brightness of the display unit 5 is set to the second brightness darker than the first brightness. The turn-on control is performed, for example, when a metal, such as a key, is present within a distance at which the touch panel unit 2 reacts with the metal. That is, when the portable electronic device 1A is put into a bag, if a metal, such as a key, is present at the first distance inside the predetermined region (Xa, Ya) 20 of the touch panel unit 2, while the touch panel unit 2 reacts the metal, and display screen on and backlight on are continued, after a predetermined time has elapsed, display screen off and backlight off are made.

(4) In the case of display screen on and backlight on (the case of the first brightness), if there is no operation on the touch panel unit 2 for the predetermined time (there is neither touch operation nor hover operation), the input object 10 (10A) is present inside the predetermined region (Xa, Ya) 20 set in the touch panel unit 2, the distance between the input object 10 (10A) and the touch panel unit 2 is equal to or smaller than the first distance, and the acceleration sensor 15 does not detect predetermined acceleration, a backlight control signal and a display control signal for maintaining backlight on (setting the third brightness brighter than the second brightness) are output to the display unit 5. That is, if there is no operation for the predetermined time, the input object 10 (10A) is at equal to or smaller than the first distance from the touch panel unit 2 over the predetermined region (Xa, Ya) 20 set in the touch panel unit 2, and the predetermined acceleration is not detected at this time, the brightness of the display unit 5 is set to the third brightness. The turn-on control is performed, for example, when the user stops with the portable electronic device 1A and performs no operation.

(5) In the case of display screen on and backlight on (the case of the first brightness), if there is no operation on the touch panel unit 2 for the predetermined time (there is neither touch operation nor hover operation), the input object 10 (10A) is present inside the predetermined region (Xa, Ya) 20 set in the touch panel unit 2, the distance between the input object 10 (10A) and the touch panel unit 2 is equal to or smaller than the first distance, and the acceleration sensor 15 detects the predetermined acceleration, a backlight control signal and a display control signal for making display screen off and backlight off (setting the second brightness darker than the first brightness) are output to the display unit 5. That is, if there is no operation for the predetermined time, the input object 10 (10A) is at equal to or smaller than the first distance from the touch panel unit 2 over the predetermined region (Xa, Ya) 20 set in the touch panel unit 2, and the predetermined acceleration is detected at this time, the brightness of the display unit 5 is set to the second brightness. The turn-on control is performed, for example, when the user walks with the portable electronic device 1A. Of course, no operation is performed.

FIGS. 9(*a*) to 9(*d*) are diagrams showing an operating form of the portable electronic device 1A of this embodiment. FIG. 9(*a*) is a diagram showing a case where the input object 10 is over the predetermined region (Xa, Ya) 20. If the input object 10 is over the predetermined region (Xa, Ya) 20, and the distance from the touch panel unit 2 is equal to or smaller than the first distance, while the input object 10 is maintained in this state, display screen on and backlight on are continued.

FIG. 9(*b*) is a diagram showing a case where the input object 10 is over a region other than the predetermined region (Xa, Ya) 20. If the input object 10 is over a region other than the predetermined region (Xa, Ya) 20, and this state is continued for a predetermined time, display screen off is made, and backlight off is also made.

FIG. 9(*c*) is a diagram showing a case where the input object 10 is over the predetermined region (Xa, Ya) 20. If the input object 10 is over the predetermined region (Xa, Ya) 20, and vibration of the portable electronic device 1A is detected by the acceleration sensor 15, display screen off is made, and backlight off is also made. The state shown in FIG. 9(*c*) is a state where the portable electronic device 1A is downward while the user moves with the portable electronic device 1A. The direction (upward or downward) of the portable electronic device 1A and the presence/absence of vibration are detected by the acceleration sensor 15. Even when the input object 10 is present in the predetermined region (Xa, Ya) 20, display screen off is made, and backlight off is also made.

FIG. 9(*d*) shows a state where the user walks with the portable electronic device 1A in a bag 30. Vibration which is generated when the user walks with the portable electronic device 1A is detected by the acceleration sensor 15. As described above, even if the touch panel unit 2 reacts with the input object 10A which is a metal key, display screen off is made, and backlight off is also made.

Next, the operation of the portable electronic device 1A of this embodiment will be described.

FIG. 10 is a flowchart showing brightness change processing when acceleration detection is not performed in the portable electronic device 1A of this embodiment. In FIG. 10, the backlight and display control unit 42A first makes display screen on (Step S10). In this case, backlight on is also included.

Next, the backlight and display control unit 42A determines whether or not the input object 10 (10A) is present inside the predetermined region (Xa, Ya) 20, and coordinate detection is made when the elapsed time t from display screen on is within the predetermined time ta (whether or not a state where the distance between the input object 10 (10A) and the touch panel unit 2 is equal to or smaller than the first distance is detected) (Step S11). With the determination of Step S11, if the input object 10 (10A) is present inside the predetermined region (Xa, Ya) 20, and coordinate detection is made when the elapsed time t from display screen on is within the predetermined time ta (when it is determined to be "Yes"), the backlight and display control unit 42A causes display screen on and backlight on to be continued. While the condition of Step S11 is established, display screen on and backlight on are continued.

If the condition of Step S11 is not established (when it is determined to be "No"), that is, when the input object 10 (10A) is located outside the predetermined region (Xa, Ya) 20, when the elapsed time t from display screen on has elapsed the predetermined time ta, or when the distance between the input object 10 (10A) and the touch panel unit 2 is greater than the first distance, the backlight and display control unit 42A makes backlight off (Step S12). After backlight off, it is determined whether or not the input object 10 (10A) is present inside the predetermined region (Xa, Ya) 20, and coordinate detection is made when the elapsed time t1 from backlight off is within the predetermined time tb (Step S13). When the condition of Step S13 is established (when it is determined to be "Yes"), the backlight and display control unit 42A makes backlight on (Step S14). While both conditions of Step S11 and Step S13 are established, display screen on and backlight on are continued.

If the condition of Step S13 is not established (when it is determined to be "No"), that is, when the input object 10 (10A) is located outside the predetermined region (Xa, Ya) 20, when the elapsed time t1 from backlight off has elapsed the predetermined time tb, or when the distance between the input object 10 (10A) and the touch panel unit 2 is greater than the first distance, the backlight and display control unit 42A makes display screen off (Step S15). After display screen off, the backlight and display control unit 42A determines whether or not any of the function keys 6-1 to 6-3 is pressed (Step S16). When any function key is not pressed (when it is determined to be "No"), the process returns to Step S15, and display screen off is continued. This state is continued until any of the function keys 6-1 to 6-3 is pressed. Meanwhile, when any of the function keys 6-1 to 6-3 is pressed (when it is determined to be "Yes"), backlight on is made (Step S17), and the process returns to Step S10.

The above operation is summarized as follows. In a state of display screen on and backlight on, when the input object 10 (10A) is present inside the predetermined region (Xa, Ya) 20, and coordinate detection is made when the elapsed time t from display screen on is within the predetermined time ta, while this condition is established, display screen on and backlight on are continued. In this state, when the input object 10 (10A) is located outside the predetermined region (Xa, Ya) 20, when the elapsed time t from display screen on has elapsed the predetermined time ta, or when the distance between the input object 10 (10A) and the touch panel unit 2 is greater than the first distance, backlight off is made. Thereafter, when the input object 10 is present inside the predetermined region (Xa, Ya) 20, and coordinate detection is made when the elapsed time t1 from display screen on is within the predetermined time tb, backlight on is made. While this condition and the previous condition are established, display screen on and backlight on are continued. If this condition is not established, display screen off is made. This state is continued until any of the function keys 6-1 to 6-3 is pressed, and if any of the function keys 6-1 to 6-3 is pressed, backlight on is made.

Figure 11:
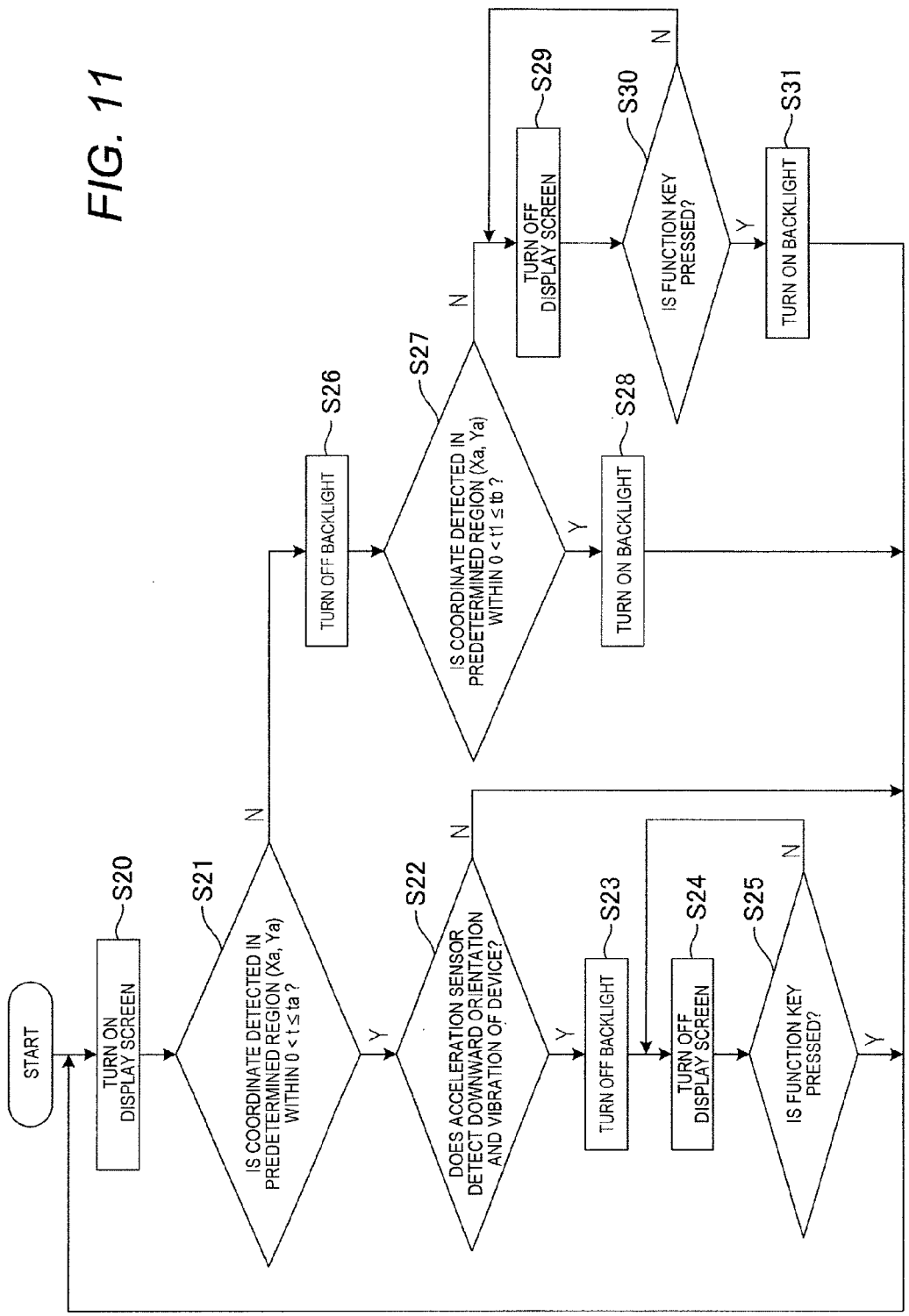
FIG. 11 is a flowchart showing brightness change processing when acceleration detection is performed in the portable electronic device of FIG. 7.

FIG. 11 is a flowchart showing brightness change processing when acceleration detection is performed in the portable electronic device 1A of this embodiment. In FIG. 11, the backlight and display control unit 42A first makes display screen on (Step S20). In this case, backlight on is also included.

Next, the backlight and display control unit 42A determines whether or not the input object 10 (10A) is present inside the predetermined region (Xa, Ya) 20, and coordinate detection is made when the elapsed time t from display screen on is within the predetermined time ta (Step S21). With the determination of Step S21, if the input object 10 (10A) is present inside the predetermined region (Xa, Ya) 20, and coordinate detection is made when the elapsed time t from display screen on is within the predetermined time ta (when it is determined to be "Yes"), the backlight and display control unit 42A determines whether or not the portable electronic device 1A is downward and vibration is present on the basis of the sensor signal output from the acceleration sensor 15 (Step S22). In this determination, when the portable electronic device 1A is downward, and vibration is present (when it is determined to be "Yes"), backlight off is made (Step S23), and next, display screen off is made (Step S24). It is determined whether or not any of the function keys 6-1 to 6-3 is pressed (Step S25). When any function key is not pressed (when it is determined to be "No"), the process returns to Step S24, and display screen off is continued. This state is continued until any of the function keys 6-1 to 6-3 is pressed. Meanwhile, when any of the function keys 6-1 to 6-3 is pressed (when it is determined to be "Yes"), the process returns to Step S20, and display screen on is made. In the determination of Step S22, when the portable electronic device 1A is other than downward, and vibration is absent (when it is determined to be "No"), the process returns to Step S20 as it is.

If the condition of Step S21 is not established (when it is determined to be "No"), that is, when the input object 10 (10A) is located outside the predetermined region (Xa, Ya) 20, when the elapsed time t from display screen on has elapsed the predetermined time ta, or when the distance between the input object 10 (10A) and the touch panel unit 2 is greater than the first distance, the backlight and display control unit 42A makes backlight off (Step S26). After backlight off, it is determined whether or not the input object 10 (10A) is present inside the predetermined region (Xa, Ya) 20, and coordinate detection is made when the elapsed time t1 from backlight off is within the predetermined time tb (Step S27). When the condition of Step S27 is established (when it is determined to be "Yes"), the backlight and display control unit 42A makes backlight on (Step S28).

If the condition of Step S27 is not established (when it is determined to be "No"), that is, when the input object 10 (10A) is located outside the predetermined region (Xa, Ya) 20, when the elapsed time t1 from backlight off has elapsed the predetermined time tb, or when the distance between the input object 10 (10A) and the touch panel unit 2 is greater than the first distance, the backlight and display control unit 42A makes display screen off (Step S29). After display screen off, the backlight and display control unit 42A determines whether or not any of the function keys 6-1 to 6-3 is pressed (Step S30). When any function key is not pressed (when it is determined to be "No"), the process returns to Step S29, and display screen off is continued. This state is continued until any of the function keys 6-1 to 6-3 is pressed. Meanwhile, when any of the function keys 6-1 to 6-3 is pressed (when it is determined to be "Yes"), backlight on is made (Step S31), and the process returns to Step S20.

The above operation is summarized as follows. In a state of display screen on and backlight on, if the input object 10 (10A) is present inside the predetermined region (Xa, Ya) 20, coordinate detection is made when the elapsed time t from display screen on is within the predetermined time ta, the portable electronic device 1A is downward, and vibration is present, backlight off is made, and display screen off is also made. In this state, if any of the function keys 6-1 to 6-3 is not pressed, display screen off is continued, and if any of the function keys 6-1 to 6-3 is pressed, display screen on is made, and backlight on is also made. In this state, when the input object 10 (10A) is located outside the predetermined region (Xa, Ya) 20, when the elapsed time t from display screen on has elapsed the predetermined time ta, or when the distance between the input object 10 (10A) and the touch panel unit 2 is greater than the first distance, backlight off is made. Thereafter, when the input object 10 (10A) is present inside the predetermined region (Xa, Ya) 20, and coordinate detection is made when the elapsed time t1 from display screen on is within the predetermined time tb, backlight on is made. If this condition is not established, display screen off is made. This state is continued until any of the function keys 6-1 to 6-3 is pressed, and if any of the function keys 6-1 to 6-3 is pressed, backlight on is made.

In this way, according to the portable electronic device 1A of this embodiment, in the case of display screen on and backlight on, if there is no operation on the touch panel unit 2 for the predetermined time, and the distance between the input object 10 (10A) and the touch panel unit 2 is greater than the first distance, since backlight on is made, power saving is achieved.

In the case of display screen on and backlight on, if there is no operation on the touch panel unit 2 for the predetermined time, the input object 10 (10A) is present inside the predetermined region (Xa, Ya) 20, and the distance between the input object 10 (10A) and the touch panel unit 2 is equal to or smaller than the first distance, backlight on is maintained.

In the case of display screen on and backlight on, if there is no operation on the touch panel unit 2 for the predetermined time, the input object 10 (10A) is present inside the predetermined region (Xa, Ya) 20 set in the touch panel unit 2, the distance between the input object 10 (10A) and the touch panel unit 2 is equal to or smaller than the first distance, and the acceleration sensor 15 does not detect the predetermined acceleration, backlight on is maintained.

In the case of display screen on and backlight on, if there is no operation on the touch panel unit 2 for the predetermined time, the input object 10 (10A) is present inside the predetermined region (Xa, Ya) 20 set in the touch panel unit 2, the distance between the input object 10 (10A) and the touch panel unit 2 is equal to or smaller than the first distance, and the acceleration sensor 15 detects the predetermined acceleration, display screen off and backlight off are made. For this reason, even if the portable electronic device 1A is hand held, if the portable electronic device 1A is not in the operating state, since the display screen is automatically darkened, power saving is achieved.

In the portable electronic device 1A of this embodiment, although the liquid crystal display is used as the display unit 5, a self-luminous display, such as an organic EL display, may be used. When a self-luminous display is used, of course, the backlight 51 is not required.

In the portable electronic device 1A of this embodiment, although a program in which the processing shown in the flowchart of FIG. 10 or 11 is described is stored in the ROM, the program may be distributed in the form of being stored in a storage medium, such as a magnetic disk, an optical disk, a magneto-optical disk, or a flash memory, or may be stored in a server (not shown) on a network, such as Internet and downloaded using a telecommunication line.

Although the portable electronic device 1A of this embodiment is applied to a portable wireless device, also known as a smartphone, the invention is not limited to a portable wireless device, and may be applied to an appliance, such as a microwave oven, or a control panel, such as a navigation of an automobile.

Embodiment 3

Figure 12:
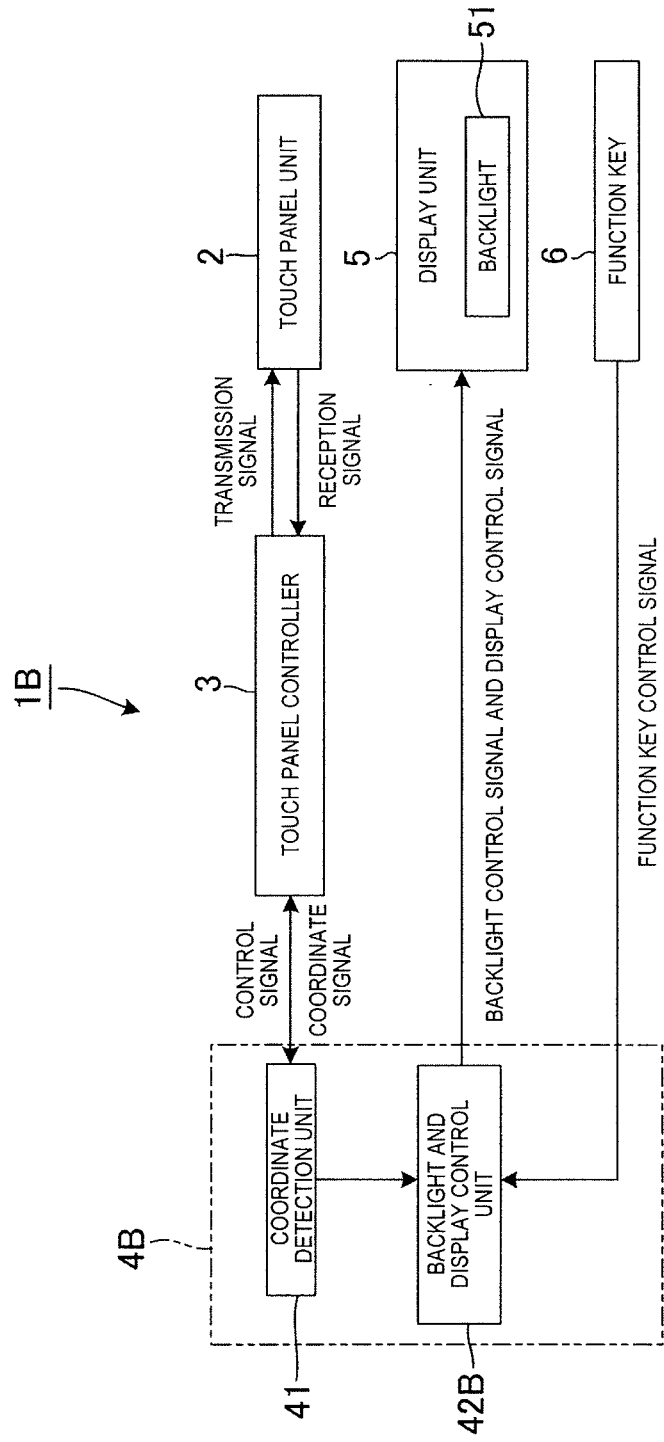
FIG. 12 is a block diagram showing the schematic configuration of a portable electronic device according to Embodiment 3 of the invention.

FIG. 12 is a block diagram showing the schematic configuration of a portable electronic device according to Embodiment 3 of the invention. In FIG. 12, the portions common to FIG. 1 are represented by the same reference numerals. Since the outline of the portable electronic device 1B of this embodiment is the same as the outline (see FIG. 2) of the portable electronic device 1 of Embodiment 1, FIG. 2 is incorporated as necessary for description. Similarly to the portable electronic device 1 of Embodiment 1, the portable electronic device 1B of this embodiment is applied to, for example, a portable wireless device, also known as a smartphone. A portion relating to communication as a wireless device is omitted.

In FIG. 12, the portable electronic device 1B of this embodiment includes a touch panel unit (touch panel) 2, a touch panel controller 3, a device control unit 4B, a display unit 5, and a function key 6. In FIG. 2, on the front surface side of the housing 7 of the portable electronic device 1B, the touch panel unit 2 and the display unit 5 are arranged in a laminated state. In a lower end portion on the front surface side of the housing 7, three function keys 6-1 to 6-3 are arranged at regular intervals. The touch panel controller 3 and the device control unit 4B are constituted by a CPU, a ROM, a RAM, and an interface circuit. A program for controlling the CPU is stored in the ROM, and the RAM is used in the operation of the CPU.

The touch panel unit 2 outputs a reception signal according to change in electric charge in a reception electrode to the touch panel controller 3. The touch panel controller 3 outputs a transmission signal to the touch panel unit 2, and also receives the reception signal output from the touch panel unit 2 as input. If the reception signal from the touch panel unit 2 is input, the touch panel controller 3 detects an input object from the input reception signal, and outputs a coordinate signal representing the position (X, Y, Z) of the detected input object to the device control unit 4B.

As the display unit 5, a liquid crystal display (LCD) is used, and brightness is supplied by the backlight 51. The function keys 6-1 to 6-3 are used to execute three functions provided in the portable electronic device 1B, and a function key control signal is output from each function key. The device control unit 4B has a coordinate detection unit 41 and a backlight and display control unit 42B. The coordinate detection unit 41 outputs a control signal to the touch panel controller 3, and outputs the coordinate signal from the touch panel controller 3 to the backlight and display control unit 42B. The coordinate signal output from the touch panel controller 3 is a signal which represents the position (X, Y, Z) of the input object above the touch panel unit 2.

The backlight and display control unit 42B outputs a backlight control signal for turning on the backlight 51 to the display unit 5, and outputs a display control signal according to touch operation or hover operation on the touch panel unit 2. The backlight and display control unit 42B executes a predetermined function in response to the function key control signal output from each of the function keys 6-1 to 6-3. The backlight and display control unit 42B detects operation (touch operation or hover operation) on the touch panel unit 2 on the basis of the coordinate signal output from the coordinate detection unit 41. That is, the proximity of the input object is determined from a Z signal in a Z-axis direction out of the coordinate signal output from the coordinate detection unit 41, and when the distance between the input object and the touch panel unit 2 is equal to or smaller than the predetermined distance (a distance greater than at least 0 (zero)), operation on the touch panel unit 2 is detected from an X signal in an X-axis direction and a Y signal in a Y-axis direction output from the coordinate detection unit 41.

If the distance between the input object and the touch panel unit 2 is equal to or smaller than the predetermined distance, the backlight and display control unit 42B calculates the area of the input object from the X signal in the X-axis direction and the Y signal in the Y-axis direction output from the coordinate detection unit 41, and performs turn-on control of the backlight 51 of the display unit 5 on the basis of the calculated area of the input object. In this case, if the distance between the input object and the touch panel unit 2 is 0, since the input object is touched on the touch panel unit 2, the area of the touched portion is calculated. If the distance between the input object and the touch panel unit 2 exceeds 0 and is equal to or smaller than the predetermined distance, since the input object is in a hover state, the area of the input object over the touch panel unit 2 is calculated.

In particular, the backlight and display control unit 42B continuously loads the coordinate signal output from the coordinate detection unit 41 after the distance between the input object and the touch panel unit 2 is equal to or smaller than the predetermined distance and repeatedly calculates the area of the input object. If the brightness of the backlight 51 of the display unit 5 is the first brightness, and a state where at least the area of the input object is greater than a first area (corresponding to a threshold value) is continued for the first time, the brightness of the backlight 51 of the display unit 5 changes to the second brightness darker than the first brightness. If the brightness of the backlight 51 of the display unit 5 is the second brightness, and a state where at least the area of the input object is smaller than a second area (corresponding to a threshold value) is continued for the second time, the brightness of the backlight 51 of the display unit 5 changes to the third brightness brighter than the second brightness. The backlight and display control unit 42B has a timer function and measures the time for which a state where the area of the input object is greater than the first area is continued, or the time for which a state where the area of the input object is smaller than the second area is continued.

Figure 13A:
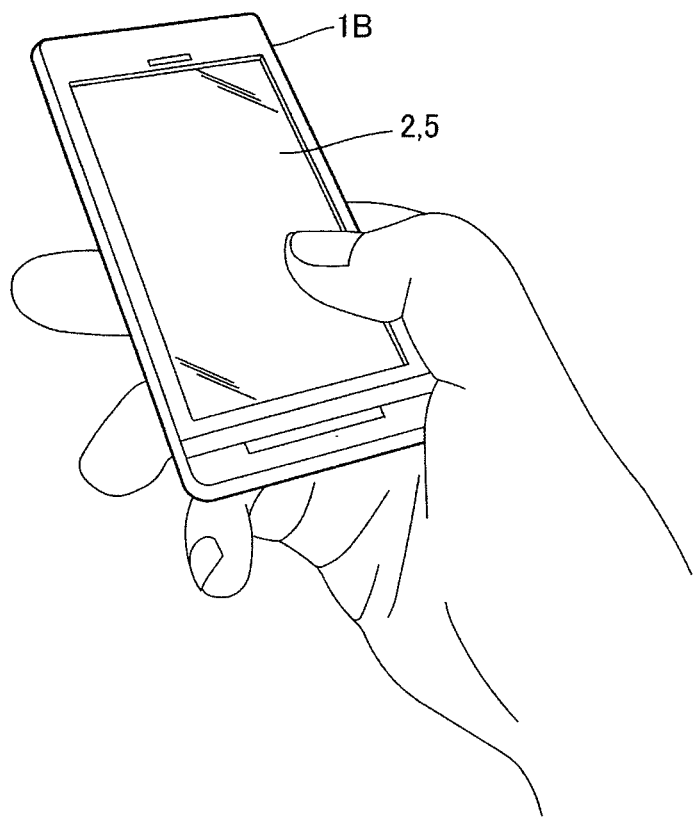
FIGS. 13(a) and 13(b) are diagrams showing an operating form of the portable electronic device of FIG. 12.
Figure 13B:
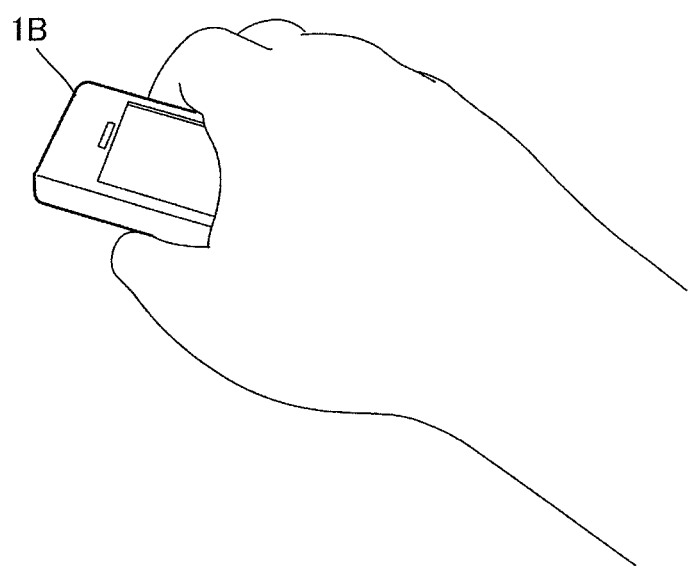

FIGS. 13(*a*) and 13(*b*) are perspective views showing an example of a state where the portable electronic device 1B of this embodiment is hand held. The state shown in FIG. 13(*a*) is an operation standby state in which some kind of display is performed on the display unit 5, and touch operation or hover operation is performed with a fingertip, and the state shown in FIG. 13(*b*) is a hand carrying state in which the portable electronic device 1B is hand held. In the case of the operation standby state shown in FIG. 13(*a*), the area of the input object on the touch panel unit 2 becomes smaller than the hand carrying state shown in FIG. 13(*b*). The states shown in FIGS. 13(*a*) and 13(*b*) become a hover state floating from the touch panel unit 2.

When the input object is a portion of a human body, an area for determining the size of the portion is set to a threshold value, thereby detecting a region of the human body. The region of the human body is a palm, a head, a cheek, an ear, or the like, other than the finger. The threshold value is set to a first area for determining a palm, thereby detecting the hand carrying state shown in FIG. 13(*b*). The threshold value is set to a second area for determining a fingertip, thereby detecting the operation standby state shown in FIG. 13(a). In this case, of course, the size relationship between the first area and the second area is the first area>the second area. The first area is different from the second area, thereby preventing chattering. In this way, the threshold value for detecting the fingertip or the palm is determined, making it possible to detect the operation standby and the hand carrying state for the portable electronic device 1B.

When the palm is detected, the backlight and display control unit 42B recognizes the portable electronic device 1B in the hand carrying state and changes the brightness of the backlight 51 of the display unit 5 to the second brightness darker than the first brightness. When the fingertip is detected, the backlight and display control unit 42B recognizes the portable electronic device 1B in the operation standby state and changes the brightness of the backlight 51 of the display unit 5 to the third brightness brighter than the second brightness.

The first area and the second area corresponding to the threshold value may be substantially equal to each other, or the first area may be greater than the second area. In this case, since there is a significant difference in size between the fingertip and the palm, the threshold value compatible with each of the fingertip and the palm is set. Meanwhile, since the cheek and the palm are substantially equal in size to each other, a single common threshold value may be set.

The first time and the second time are substantially equal to each other or may be different from each other.

The continuation condition of the time (first time and second time) may not be provided. However, the continuation condition of the time is provided, thereby preventing erroneous operation.

The third brightness of the backlight 51 of the display unit 5 may be brighter than the second brightness and may be equal to or smaller than the first brightness or may be equal to the first brightness. The second brightness may be brightness during turn-off.

Next, the operation of the portable electronic device 1B of this embodiment will be described.

Figure 14:
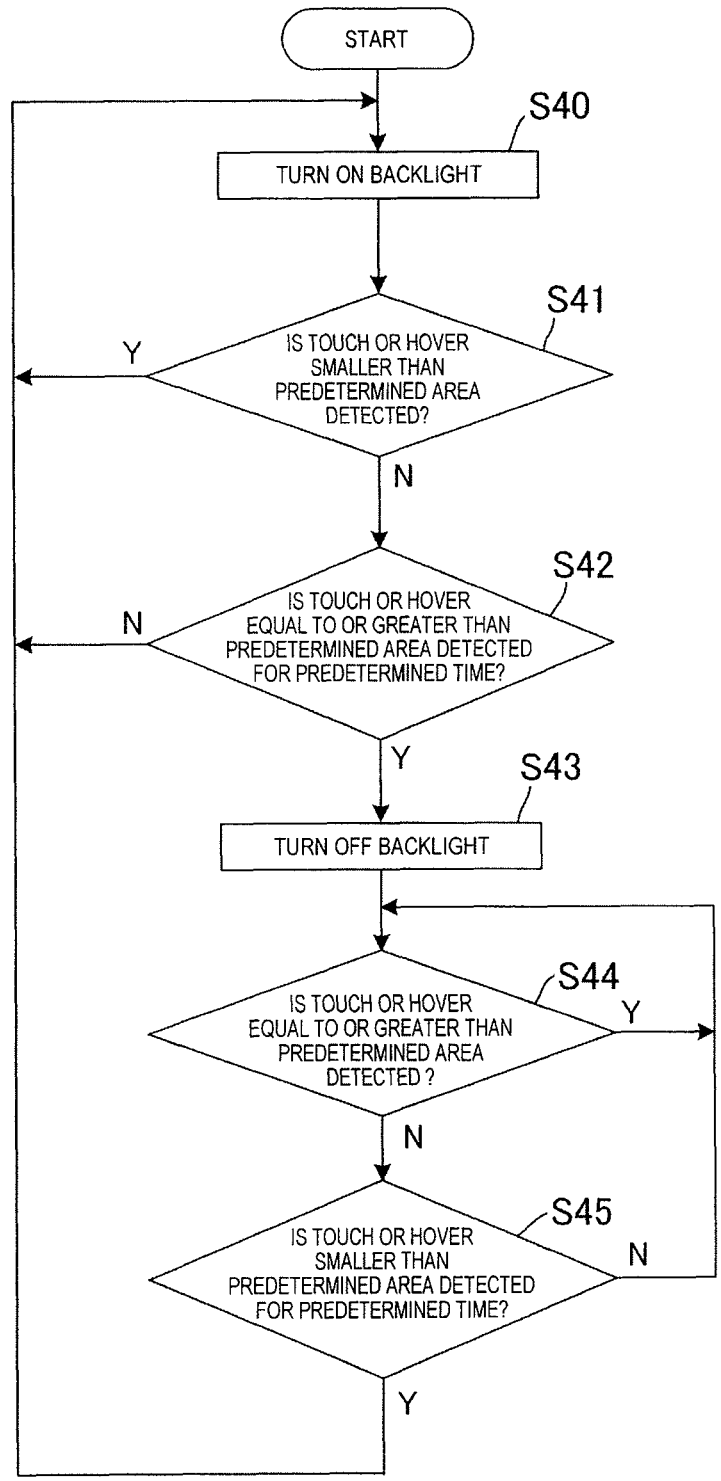
FIG. 14 is a flowchart showing brightness change processing of the portable electronic device of FIG. 12.

FIG. 14 is a flowchart showing brightness change processing of the portable electronic device 1B of this embodiment. In the description of this operation, the first area and the second area are a single area (predetermined area), and the first duration and the second duration are a single time (predetermined time).

In FIG. 14, the backlight and display control unit 42B first turns on the backlight 51 of the display unit 5 (Step S40). Next, the backlight and display control unit 42B determines whether or not touch or hover smaller than a predetermined area of the region of the human body on the touch panel unit 2 is detected (Step S41). That is, it is determined whether touch on the touch panel unit 2 is touch smaller than the predetermined area or whether hover on the touch panel unit 2 is hover smaller than the predetermined area. In this determination, when touch or hover smaller than the predetermined area of the region of the human body on the touch panel unit 2 is detected (that is, when it is determined in Step S41 to be "Yes"), the on state of the backlight 51 of the display unit 5 is continued. Meanwhile, when touch or hover smaller than the predetermined area of the region of the human body on the touch panel unit 2 is not detected (that is, when it is determined in Step S41 to be "No"), the backlight and display control unit 42B determines whether or not touch or hover equal to or greater than the predetermined area of the region of the human body on the touch panel unit 2 is detected for a predetermined time (Step S42).

When touch or hover equal to or greater than the predetermined time is not detected for the predetermined time (that is, when it is determined in Step S42 to be "No"), the backlight and display control unit 42B causes the on state of the backlight 51 of the display unit 5 to be continued. Meanwhile, when touch or hover equal to or greater than the predetermined time is detected for the predetermined time (that is, when it is determined in Step S42 to be "Yes"), the backlight and display control unit 42B turns off the backlight 51 of the display unit 5 (Step S43). After the backlight 51 is turned off, it is determined whether or not touch or hover equal to or greater than the predetermined area is detected (Step S44). When touch or hover equal to or greater than the predetermined area is detected (that is, when it is determined in Step S44 to be "Yes"), the off state of the backlight 51 of the display unit 5 is continued. Meanwhile, when touch or hover equal to or greater than the predetermined area is not detected (that is, when it is determined in Step S44 to be "No"), the backlight and display control unit 42B determines whether or not touch or hover smaller than the predetermined area is detected for the predetermined time (Step S45). When touch or hover smaller than the predetermined area is not detected for the predetermined time (that is, when it is determined in Step S45 to be "No"), the off state of the backlight 51 of the display unit 5 is continued.

Meanwhile, when touch or hover smaller than the predetermined area is detected for the predetermined time (that is, when it is determined in Step S45 to be "Yes"), the backlight and display control unit 42B changes the backlight 51 of the display unit 5 from the off state to the on state. The processing of Steps S40 to S45 is repeatedly performed.

In this way, according to the portable electronic device 1B of this embodiment, in a state where the brightness of the backlight 51 of the display unit 5 is the first brightness, when a state where at least the area of the region of the human body is greater than the first area is continued for the first time, since the brightness of the backlight 51 of the display unit 5 changes to the second brightness darker than the first brightness, while there is no operation on the touch panel unit 2, and the portable electronic device 1B is just hand held, it is possible to keep the display screen in a dark state, thereby achieving power saving. Even if the area of the region of the human body is temporarily greater than the first area, since the brightness does not change to the second brightness, it is possible to prevent erroneous operation.

In a state where the brightness of the backlight 51 of the display unit 5 is the second brightness, when a state where at least the area of the region of the human body is smaller than the second area is continued for the second time, since the brightness of the backlight 51 of the display unit 5 changes to the third brightness brighter than at least the second brightness, during standby for operation on the touch panel unit 2 or while operation is performed on the touch panel unit 2, it is possible to maintain the display screen in a bright state. Even if the area of the region of the human body is temporarily smaller than the second area, since the brightness does not change to the third brightness, it is possible to prevent erroneous operation.

In the portable electronic device 1B of this embodiment, although the liquid crystal display (LCD) is used as the display unit 5, a self-luminous display, such as an organic EL (Electro Luminescence) display, may be used. When a self-luminous display is used, of course, the backlight 51 is not required.

In the portable electronic device 1B of this embodiment, although a program in which the processing shown in the flowchart of FIG. 14 is described is stored in the ROM, the program may be distributed in the form of being stored in a storage medium, such as a magnetic disk, an optical disk, a magneto-optical disk, or a flash memory, or may be stored in a server (not shown) on a network, such as Internet and downloaded using a telecommunication line.

In the portable electronic device 1B of this embodiment, a predetermined distance may be a first distance, a second distance smaller than the first distance may be set, and a predetermined function which operates when the distance between the region of the human body and the touch panel unit 2 is equal to or smaller than the second distance may be provided. As the predetermined function, for example, there are functions corresponding to icons displayed on the display unit 5. Accordingly, the fingertip approaches the touch panel unit 2 to be equal to or smaller than the second distance, whereby an icon directly below the fingertip is selected and a function corresponding to the icon operates.

Although the portable electronic device 1B of this embodiment is applied to a portable wireless device, also known as a smartphone, the invention is not limited to a portable wireless device, and may be applied to an appliance, such as a microwave oven, or a control panel, such as a navigation of an automobile.

Although the invention has been described in detail or referring to specific embodiments, it is obvious to those skilled in the art that various alterations or modifications may be made without departing from the spirit and scope of the invention.

This application is based on Japanese Patent Application No. 2012-177369, filed Aug. 9, 2012, Japanese Patent Application No. 2012-194321, filed Sep. 4, 2012, and Japanese Patent Application No. 2012-276225, filed Dec. 18, 2012, the disclosures of which are incorporated herein by reference.

INDUSTRIAL APPLICABILITY

The invention can be applied to a portable electronic device which has an effect of allowing a user to arbitrarily set brightness of a display screen even if there is no operation on the touch panel for a predetermined time, and has an electrostatic capacitance type touch panel and a display disposed to overlap the touch panel.

DESCRIPTION OF REFERENCE SIGNS 1, 1A, 1B: Portable Electronic Device
2: Touch Panel Unit
3: Touch Panel Controller
4, 4A, 4B: Device Control Unit
5: Display Unit
6, 6-1 to 6-3: Function Key
7: Housing
10, 10A: Input Object (Finger)
15: Acceleration Sensor
20: Predetermined Region (Xa, Ya)
30: Bag
41: Coordinate Detection Unit
42, 42A, 42B: Backlight and Display Control Unit
51: Backlight

The invention claimed is:

1. A portable electronic device comprising: a display; an acceleration sensor that detects walking associated vibration of the portable electronic device and detects an orientation of the portable electronic device; a touch panel that overlaps the display and detects a distance from an input object; and a controller that sets a brightness of the display, wherein the controller sets the brightness of the display to a first brightness, when the detected distance is equal to or smaller than a predetermined distance and the walking associated vibration is not detected, and the controller sets the brightness of the display to a second brightness, which is darker than the first brightness, when the detected distance is equal to or smaller than the predetermined distance and the walking associated vibration is detected, and when the brightness of the display is the first brightness, and when there is no operation on the touch panel for a first time period, and when the detected distance is greater than the predetermined distance, the controller changes the brightness of the display from the first brightness to the second brightness, and thereafter, when the brightness of the display is the second brightness, and when there is no operation on the touch panel for a second time period, and when the detected distance is greater than the predetermined distance, the controller turns the display off.

2. The portable electronic device according to claim 1, wherein the second brightness is brightness of turn-off.

3. The portable electronic device according to claim 1, wherein the display is a liquid crystal display, and wherein the brightness is provided by a backlight of the liquid crystal display.

4. The portable electronic device according to claim 1, wherein the display is a self-luminous display, and the brightness is provided by self-luminescence of the display.

5. The portable electronic device according to claim 4, wherein the self-luminous display is an organic EL display.

6. The portable electronic device according to claim 1, wherein the predetermined distance is a first distance, wherein the portable electronic device further has a predetermined function which operates when the detected distance is equal to or smaller than a second distance, and wherein the first distance is greater than the second distance.

7. The portable electronic device according to claim 1, wherein when the brightness of the display is the first brightness, and there is no operation on the touch panel for a predetermined time, the controller changes the brightness of the display from the first brightness to the second brightness, when the detected distance is greater than the predetermined distance, and the controller changes the brightness of the display from the first brightness to a third brightness, which is brighter than the second brightness, when a position of the input object is in a predetermined region, and the detected distance is equal to or smaller than the predetermined distance.

8. The portable electronic device according to claim 7, wherein when the brightness of the display is the first brightness, and there is no operation on the touch panel for the predetermined time, the controller changes the brightness of the display from the first brightness to the second brightness, when the position of the input object is located outside of the predetermined region, and the detected distance is equal to or smaller than the predetermined distance.

9. The portable electronic device according to claim 7, wherein the third brightness is brighter than the second brightness and is equal to or darker than the first brightness.

10. The portable electronic device according to claim 9, wherein the third brightness is equal to the first brightness.

11. The portable electronic device according to claim 7, wherein the second brightness is brightness of turn-off.

12. The portable electronic device according to claim 7, wherein the display is a liquid crystal display, and
wherein the brightness is provided by a backlight of the liquid crystal display.

13. The portable electronic device according to claim 7, wherein the display is a self-luminous display, and
wherein the brightness is provided by self-luminescence of the display.

14. The portable electronic device according to claim 13, wherein the self-luminous display is an organic EL display.

15. The portable electronic device according to claim 7, wherein the predetermined distance is a first distance,
wherein the portable electronic device further has a predetermined function which operates when the detected distance is equal to or smaller than a second distance, and
wherein the first distance is greater than the second distance.

16. The portable electronic device according to claim 1, wherein
when the brightness of the display is the first brightness and there is no operation on the touch panel for a predetermined time,
the controller changes the brightness of the display from the first brightness to the second brightness, when the detected distance is greater than the predetermined distance, and
the controller changes the brightness of the display from the first brightness to a third brightness, which is brighter than the second brightness, when the detected distance is equal to or smaller than the predetermined distance.

17. The portable electronic device according to claim 16, wherein the third brightness is brighter than the second brightness and is equal to or darker than the first brightness.

18. The portable electronic device according to claim 17, wherein the third brightness is equal to the first brightness.

19. The portable electronic device according to claim 1, wherein the controller sets the brightness of the display to the second brightness, when the detected distance is equal to or smaller than the predetermined distance, the walking associated vibration is detected, and the detected orientation indicates that the portable electronic device is oriented downward.

20. A brightness control method which is usable in a portable electronic device comprising a display, an acceleration sensor that detects a predetermined acceleration, and a touch panel, which overlaps the display and detects a distance from an input object, the method comprising:
detecting walking associated vibration of the portable electronic device and detects an orientation of the portable electronic device;
detecting the distance of the input object from the touch panel;
determining whether the acceleration sensor detects the predetermined acceleration; setting a brightness of the display to a first brightness, in response to the detected distance being equal to or smaller than the predetermined distance and in response to a determination that the walking associated vibration is not detected; and setting the brightness of the display to a second brightness, which is darker than the first brightness, in response to the detected distance being equal to or smaller than the predetermined distance and in response to a determination that the walking associated vibration is detected, and
wherein, when the brightness of the display is the first brightness, and when there is no operation on the touch panel for a first time period, and when the detected distance is greater than the predetermined distance, the brightness of the display is changed from the first brightness to the second brightness, and thereafter,
when the brightness of the display is the second brightness, and when there is no operation on the touch panel for a second time period, and when the detected distance is greater than the predetermined distance, the display is turned off.

* * * * *